(12) United States Patent
Huang et al.

(10) Patent No.: US 12,163,641 B2
(45) Date of Patent: *Dec. 10, 2024

(54) DOWNLIGHT APPARATUS

(71) Applicant: XIAMEN ECO LIGHTING CO., LTD, Xiamen (CN)

(72) Inventors: Huiyong Huang, Xiamen (CN); Zhenyu Tang, Xiamen (CN); Shuxing Gao, Xiamen (CN)

(73) Assignee: XIAMEN ECO LIGHTING CO., LTD, Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/212,759

(22) Filed: Jun. 22, 2023

(65) Prior Publication Data

US 2024/0003507 A1    Jan. 4, 2024

Related U.S. Application Data

(63) Continuation of application No. 17/471,042, filed on Sep. 9, 2021, now Pat. No. 11,761,596.

(30) Foreign Application Priority Data

Sep. 9, 2020   (CN) .......................... 202021962277.X
Sep. 9, 2020   (CN) .......................... 202021962480.7
(Continued)

(51) Int. Cl.
*F21S 8/02*     (2006.01)
*F21V 8/00*     (2006.01)
(Continued)

(52) U.S. Cl.
CPC ................. *F21S 8/026* (2013.01); *F21S 8/02* (2013.01); *F21V 15/01* (2013.01); *F21V 21/04* (2013.01);
(Continued)

(58) Field of Classification Search
CPC .. F21S 8/02; F21S 8/026; F21V 15/01; F21V 21/14; F21V 23/04
See application file for complete search history.

(56) References Cited

U.S. PATENT DOCUMENTS 11,460,158 B1 * 10/2022 Wang ..................... F21V 21/30
2020/0340651 A1 * 10/2020 Huang ................... F21V 23/04
(Continued)

*Primary Examiner* — Christopher E Dunay
(74) *Attorney, Agent, or Firm* — Chun-Ming Shih; LANWAY IPR SERVICES

(57) ABSTRACT

A downlight apparatus includes a light source, a light holder, a driver box, a fixing bracket and two torsion springs. The light holder is used for placing the light source. The light holder has a first side defining a light opening. The driver box is placed on a second side of the light holder. The driver box contains a driver for converting an external power to a driving current supplied to the light source to emit a light from the light opening. The fixing bracket is coupled to the light holder for fixing to an installation cavity. The fixing bracket has a bottom plate and two connector plate. The bottom plate is fixed to the second side of the light holder. The two connector plates are disposed vertically to the bottom plate. Each connector plate has two side units. Each torsion spring has an elastic center and two arms.

19 Claims, 48 Drawing Sheets

(30) Foreign Application Priority Data

| Sep. 9, 2020 | (CN) | 202021962759.5 |
|---|---|---|
| Sep. 9, 2020 | (CN) | 202021963476.2 |
| Sep. 9, 2020 | (CO) | 202021963435.3 |
| Sep. 10, 2020 | (CN) | 202021973305.8 |
| Sep. 10, 2020 | (CN) | 202021973469.0 |
| Sep. 10, 2020 | (CN) | 202021973704.4 |
| Sep. 10, 2020 | (CN) | 202021973937.4 |
| Sep. 10, 2020 | (CN) | 202021974013.6 |
| Sep. 10, 2020 | (CN) | 202021974312.X |
| Sep. 10, 2020 | (CN) | 202021974314.9 |
| Sep. 10, 2020 | (CN) | 202021974622.1 |

(51) Int. Cl.
| *F21V 15/01* | (2006.01) |
|---|---|
| *F21V 21/04* | (2006.01) |
| *F21V 21/14* | (2006.01) |
| *F21V 21/26* | (2006.01) |
| *F21V 23/00* | (2015.01) |
| *F21V 23/04* | (2006.01) |
| *F21V 23/06* | (2006.01) |
| *F21V 29/70* | (2015.01) |
| *F21Y 115/10* | (2016.01) |

(52) U.S. Cl.
CPC ............... *F21V 21/14* (2013.01); *F21V 21/26* (2013.01); *F21V 23/003* (2013.01); *F21V 23/007* (2013.01); *F21V 23/04* (2013.01); *F21V 23/06* (2013.01); *F21V 29/70* (2015.01); *G02B 6/0085* (2013.01); *F21V 21/047* (2013.01); *F21V 21/049* (2013.01); *F21Y 2115/10* (2016.08)

(56) References Cited

U.S. PATENT DOCUMENTS

| 2020/0400295 | A1* | 12/2020 | Shen | F21V 21/088 |
| 2022/0074583 | A1* | 3/2022 | Huang | F21V 21/04 |
| 2022/0243903 | A1* | 8/2022 | Chen | F21V 21/042 |

* cited by examiner

DOWNLIGHT APPARATUS

RELATED APPLICATION

The present application is a continued application of U.S. application Ser. No. 17/471,042.

FIELD

The present invention is related to a downlight apparatus, and more particularly related to a downlight apparatus with an easy assembly structure.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

Downlight devices are widely used in various places. It is beneficial to find out improvements of downlight devices to provide a more convenient and more safe downlight products.

In addition, it is important to provide a convenient assembly structure. The structure includes complexity reducing during manufacturing and during installation. Downlight devices are widely used in various places. It is beneficial to find out improvements of downlight devices to provide a more convenient and more safe downlight products.

In addition, it is important to provide a convenient assembly structure. The structure includes complexity reducing during manufacturing and during installation. Downlight devices are widely used in various places. It is beneficial to find out improvements of downlight devices to provide a more convenient and more safe downlight products.

In addition, it is important to provide a convenient assembly structure. The structure includes complexity reducing during manufacturing and during installation. Downlight devices are widely used in various places. It is beneficial to find out improvements of downlight devices to provide a more convenient and more safe downlight products.

In addition, it is important to provide a convenient assembly structure. The structure includes complexity reducing during manufacturing and during installation.

SUMMARY

In some embodiments, a downlight apparatus includes a light source, a light holder, a driver box, a fixing bracket and two torsion springs.

The light holder is used for placing the light source. The light holder has a first side defining a light opening.

The driver box is placed on a second side of the light holder.

The driver box contains a driver for converting an external power to a driving current supplied to the light source to emit a light from the light opening.

The fixing bracket is coupled to the light holder for fixing to an installation cavity.

The fixing bracket has a bottom plate and two connector plate.

The bottom plate is fixed to the second side of the light holder.

The two connector plates are disposed vertically to the bottom plate.

Each connector plate has two side units.

Each torsion spring has an elastic center and two arms.

The two arms are elastically spreading with different angles with respect to the elastic center.

The two torsion springs are attached to a lateral side of the two connector plates.

Either the two torsion springs are elastically squeezed to engage the installation cavity or the side units of the connector plates are elastically squeezed to engage the installation cavity.

In some embodiments, the installation cavity is a cavity in a junction box.

In some embodiments, the bottom plate of the fixing bracket has a central hole for the driver box to pass through.

In some embodiments, the driver box has an elastic hook.

When the central hole of the bottom plate passes reaches a bottom edge of the driver box, the elastic hook locks the bottom plate to the second side of the light holder.

In some embodiments, the bottom plate has multiple connection holes for fixing the bottom plate to the installation cavity with bracket connectors.

In some embodiments, the connection hole is a key hole with an larger entrance and a smaller siding track.

The bracket connector enters the larger entrance and then stays in the sliding track to fix the bottom bracket to the installation cavity.

In some embodiments, the connector plates are detachable from the bottom plate.

In some embodiments, the connector plates are fixed to the bottom plate with screws.

In some embodiments, the two side units are two folded plates folding with respect to a main body of the connector plate.

In some embodiments, a folding angle of the folded plate with respect to the main body of the connector plate is larger than 90 degrees.

In some embodiments, the connector plates are made as the same metal piece as the bottom plate and are folded vertically with respect to the bottom plate.

In some embodiments, the fixing bracket has a scraper for scraping a portion of electric insulation layer on the second side of the light holder for electrically connecting the light holder to ground.

In some embodiments, the light source includes multiple LED modules distributed in a first range.

The bottom plate has a larger size than the first range to carry heat of the first range outside the first range.

In some embodiments, the bottom plate has multiple bracket connectors.

The second side of the light holder has corresponding multiple holder connectors.

The bracket connectors are respectively slided to engage the holder connectors by rotating the light holder with respect to to the fixing bracket.

In some embodiments, a reverse lock structure prevents the bracket connector accidently escape from the holder connector.

In some embodiments, the bracket connector is vertical to the holder connector.

In some embodiments, a top plate of the driver box has a wire socket and a manual switch.

The wire socket is connected to a power wire and the manual switch is used for adjusting a setting of the light source.

In some embodiments, the top plate of the driver box further has a rotation switch for continuously setting a maximum light intensity of the light source.

In some embodiments, the light source has a light source plate mounted with LED modules.

The light source plate is connected to the light holder to connect to the ground. In some embodiments, multiple metal shafts are used for electrically connecting the light source plate and the light holder.

DETAILED DESCRIPTION

Figure 87:
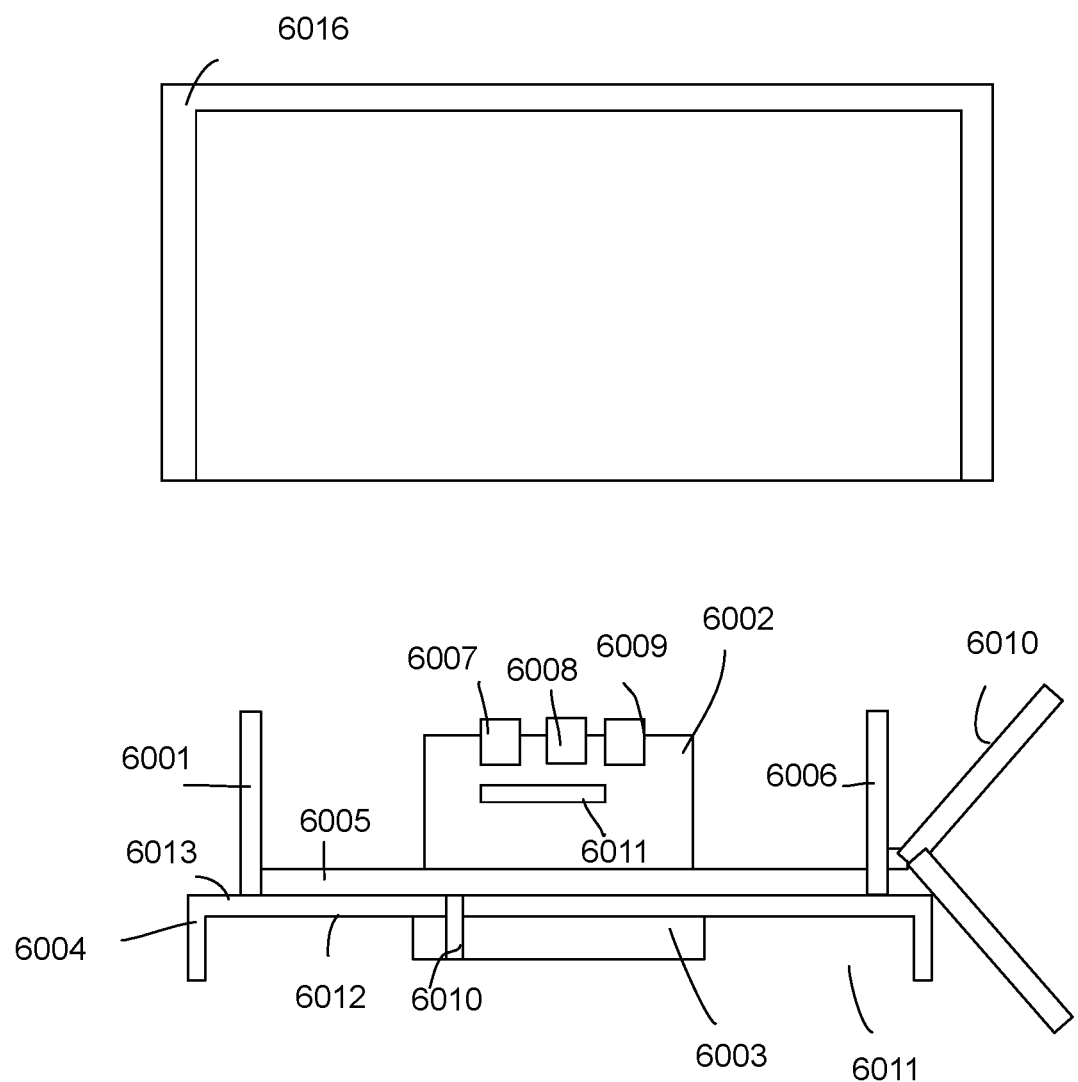
FIG. 87 shows another downlight example.

In FIG. 87, a downlight apparatus includes a light source 6003, a light holder 6004, a driver box 6002, a fixing bracket 6001 and two torsion springs 6010.

The light holder 6004 is used for placing the light source 6003. The light holder 6004 has a first side 6012 defining a light opening 6011.

The driver box 6002 is placed on a second side 6013 of the light holder 6004.

The driver box 6002 contains a driver 6011 for converting an external power to a driving current supplied to the light source 6003 to emit a light from the light opening 6011.

The fixing bracket 6001 is coupled to the light holder 6004 for fixing to an installation cavity, e.g. a cavity in a ceiling or a junction box. A junction box refers to a metal or a plastic box pre-installed in a cavity or other platform for inserting a downlight apparatus.

The fixing bracket 6001 has a bottom plate 6005 and two connector plate 6006.

The bottom plate 6005 is fixed to the second side 6013 of the light holder 6004.

The two connector plates 6006 are disposed vertically to the bottom plate 6005. Specifically, the two connector plates 6006 may be disposed with 90 or similar angle with respect to the bottom plate 6005.

Each connector plate 6006 has two side units.

Figure 67:
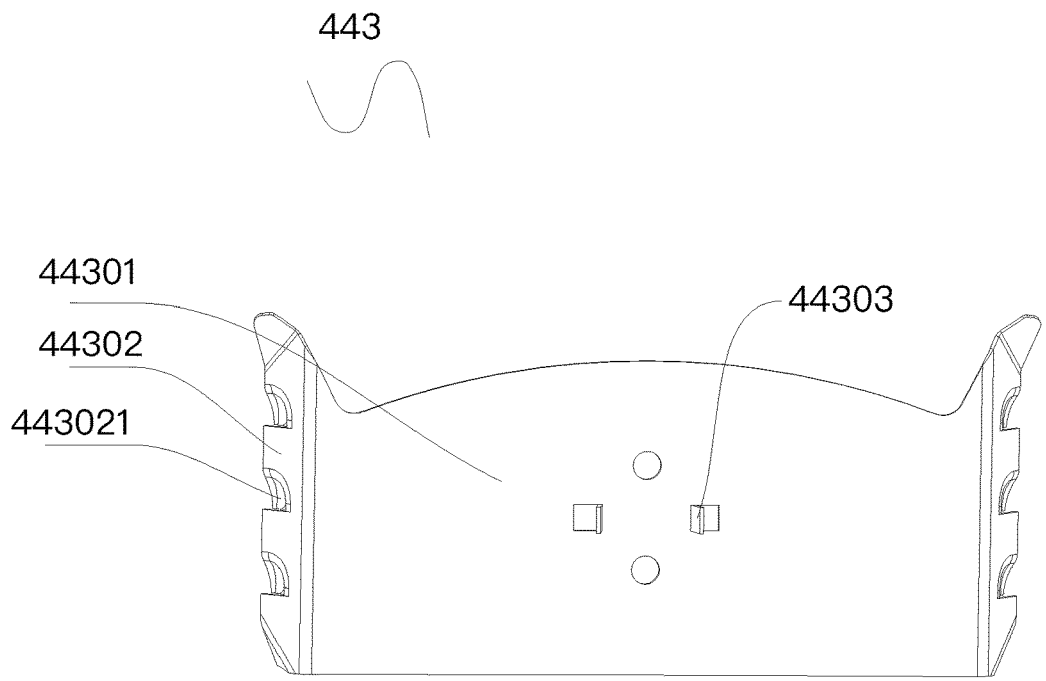
FIG. 67 illustrates an elastic plate example.

FIG. 67 shows an example of the connector plate 44301. The connector plate 44301 has two side units 440302 on two sides of the connector plate 44301.

In FIG. 87, each torsion spring 6610 has an elastic center and two arms.

Figure 57:
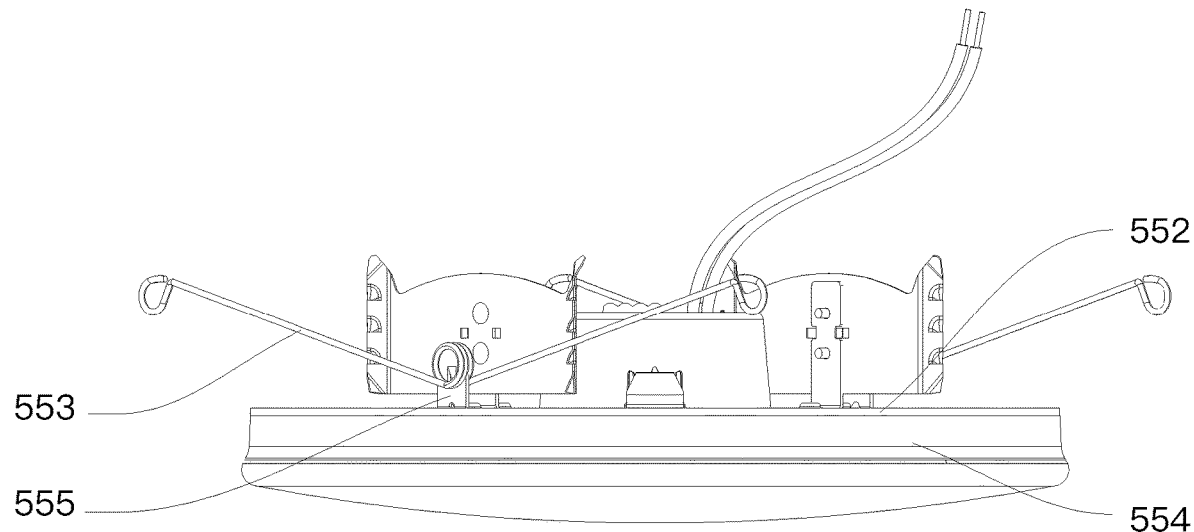
FIG. 57 illustrates another downlight example.

FIG. 57 shows such an example. In FIG. 57, a torsion spring has an elastic center 555 with two arms 553.

The two arms 553 are elastically spreading with different angles with respect to the elastic center 555. When an external force is applied on the two arms 553, the angle between the two arms 553 is changed, thus changing a spreading span of the two arms 553.

The spreading span is changed to insert the torsion springs into a junction box.

In FIG. 87, the two torsion springs 6610 are attached to a lateral side of the two connector plates 6006.

Either the two torsion springs are elastically squeezed to engage the installation cavity 6016 or the side units of the connector plates 6006 are elastically squeezed to engage the installation cavity.

There are several sizes of junction boxes defining different diameters of the installation cavity 6016. In some larger installation cavity, the torsion springs are used for attaching the downlight apparatus to the installation cavity. In some smaller installation cavity, the side units of the connector plates 6006 engages the installation cavity to attach the downlight apparatus to the installation cavity.

In some embodiments, the installation cavity is a cavity in a junction box.

Figure 66:
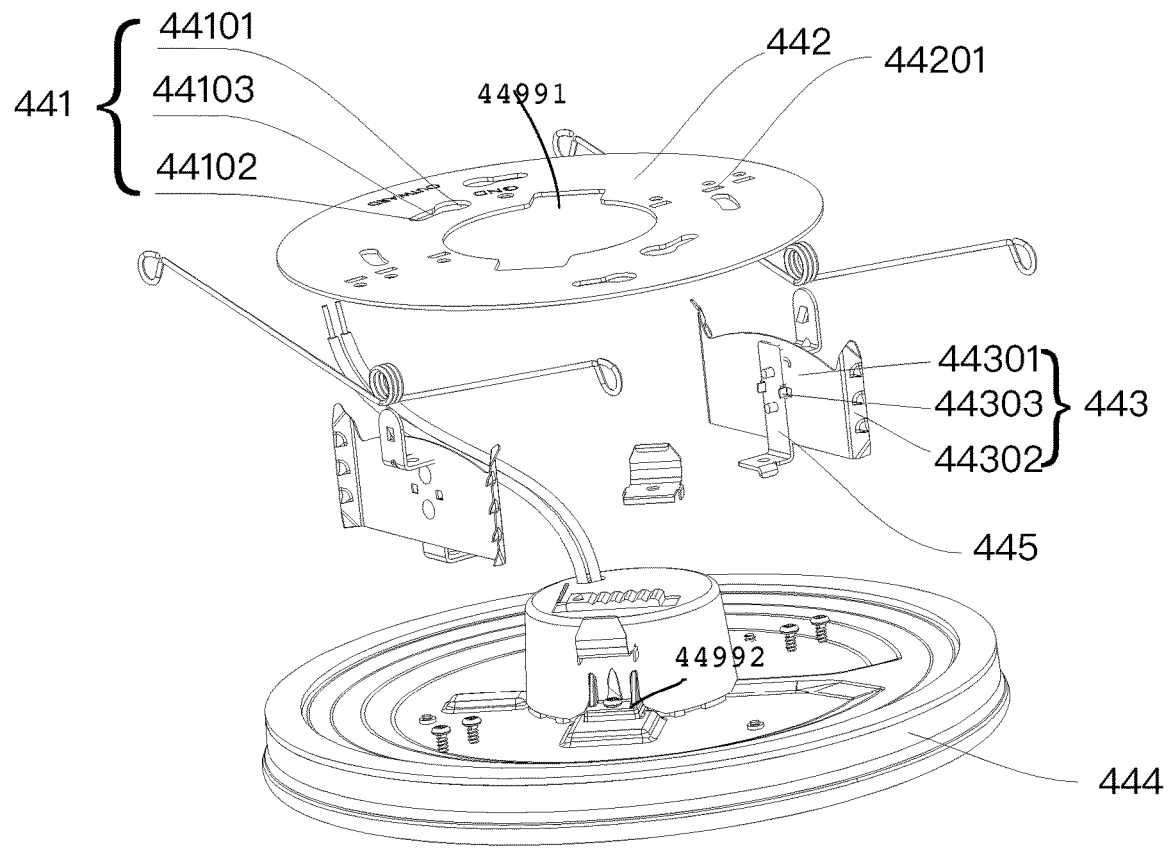
FIG. 66 illustrates an exploded view of the example in FIG. 65.

In FIG. 66, the bottom plate of the fixing bracket has a central hole 44991 for the driver box to pass through.

In FIG. 66, the driver box or the holder plate has an elastic hook 44992.

When the central hole 44991 of the bottom plate passes reaches a bottom edge of the driver box, the elastic hook 44992 locks the bottom plate to the second side of the light holder.

In FIG. 66, the bottom plate has multiple connection holes 441 for fixing the bottom plate to the installation cavity with bracket connectors, e.g. screws.

In some embodiments, the connection hole is a key hole with an larger entrance 44101 and a smaller siding track 44102, as shown in FIG. 66.

The bracket connector enters the larger entrance and then stays in the sliding track to fix the bottom bracket to the installation cavity.

In FIG. 66, the connector plates 443 are detachable from the bottom plate 442.

In some embodiments, the connector plates are fixed to the bottom plate with screws, as shown in the exploded view in FIG. 66.

In FIG. 66, the two side units 44302 are two folded plates folding with respect to a main body 44301 of the connector plate 443.

In some embodiments, a folding angle of the folded plate with respect to the main body of the connector plate is larger than 90 degrees.

In some embodiments, the connector plates are made as the same metal piece as the bottom plate and are folded vertically with respect to the bottom plate.

Figure 18:
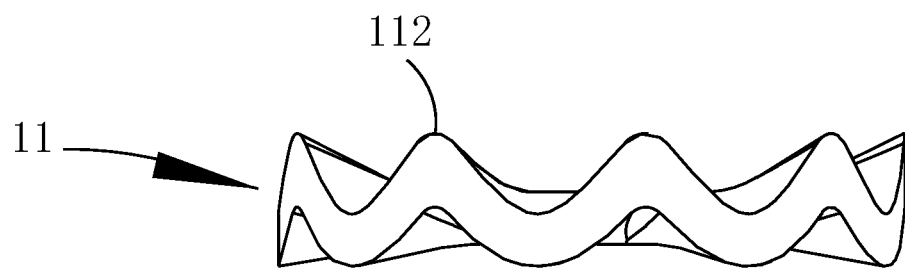
FIG. 18 illustrates another view of the example in FIG. 16.

In some embodiments, the fixing bracket has a scraper, e.g. a sharpen surface or a wave structure 112 in FIG. 18 for scraping a portion of electric insulation layer on the second side of the light holder for electrically connecting the light holder to ground.

Figure 88:
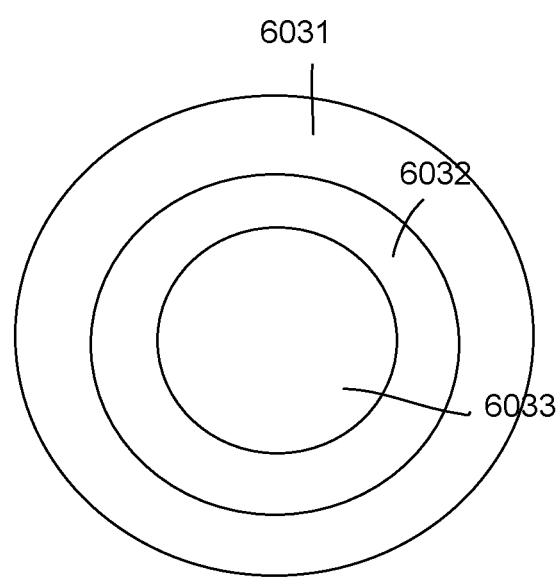
FIG. 88 shows a range diagram.

In FIG. 88, the light source includes multiple LED modules distributed in a first range 6033.

The bottom plate on the holder plate 6031 of the light holder has a larger size 6032 than the first range to carry heat of the first range outside the first range.

Figure 83:
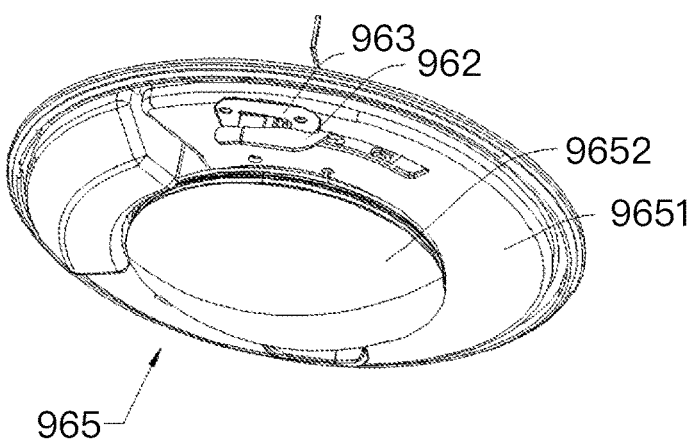
FIG. 83 illustrates another view of the example in FIG. 82.

In FIG. 83, the bottom plate has multiple bracket connectors 962.

The second side of the light holder has corresponding multiple holder connectors 963.

The bracket connectors 962 are respectively slided to engage the holder connectors 963 by rotating the light holder with respect to to the fixing bracket.

Figure 81:
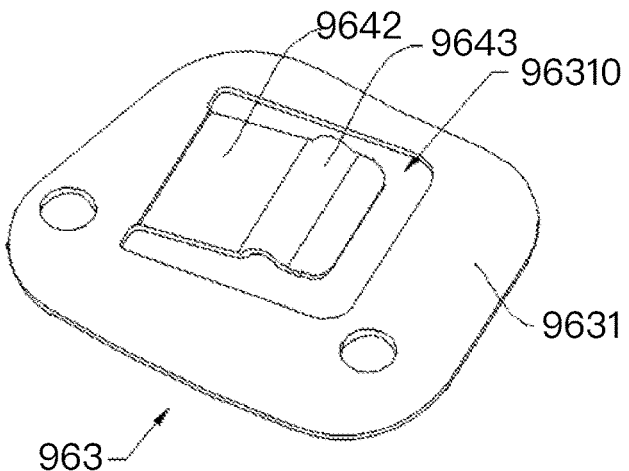
FIG. 81 illustrates an elastic stop unit example.

In FIG. 81, a reverse lock structure 9643 prevents the bracket connector 963 accidently escape from the holder connector 963.

In some embodiments, the bracket connector is vertical to the holder connector, as shown in FIG. 83.

In FIG. 87, a top plate of the driver box has a wire socket 6007 and a manual switch 6008.

The wire socket 6007 is connected to a power wire and the manual switch 6008 is used for adjusting a setting of the light source.

In some embodiments, the top plate of the driver box further has a rotation switch 6009 for continuously setting a maximum light intensity of the light source.

In some embodiments, the light source has a light source plate mounted with LED modules.

The light source plate is connected to the light holder to connect to the ground.

In FIG. 87, multiple metal shafts 6010 are used for electrically connecting the light source plate and the light holder.

Figure 1:
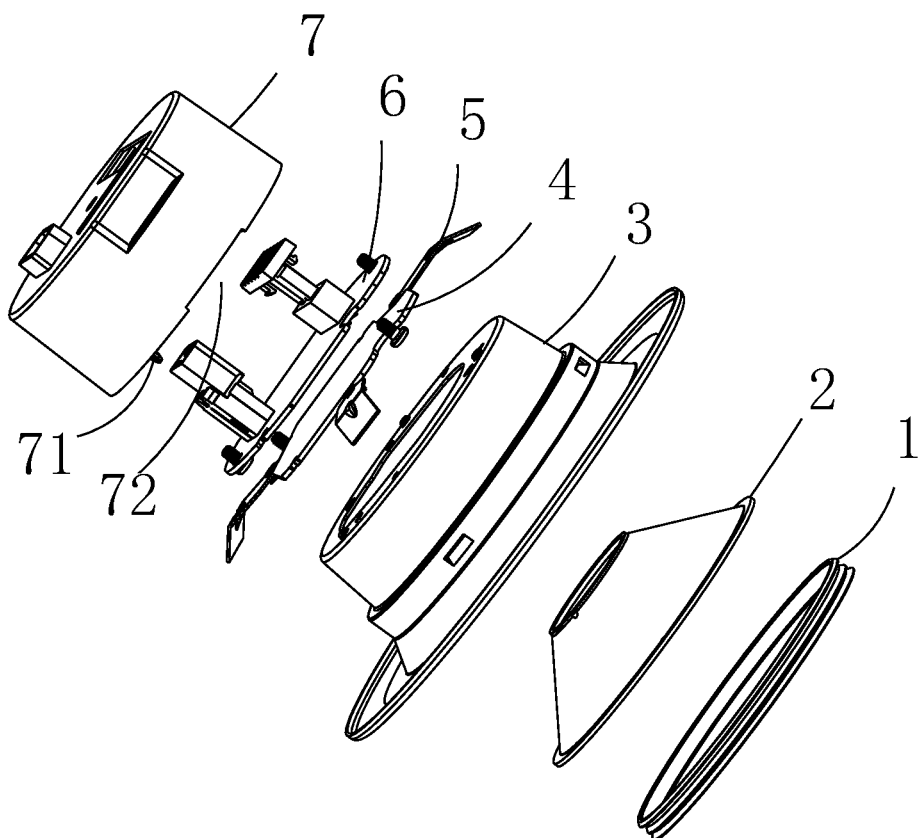
FIG. 1 illustrates an exploded view of a downlight apparatus.

FIG. 1 illustrates an exploded view of a downlight apparatus.

Figure 2:
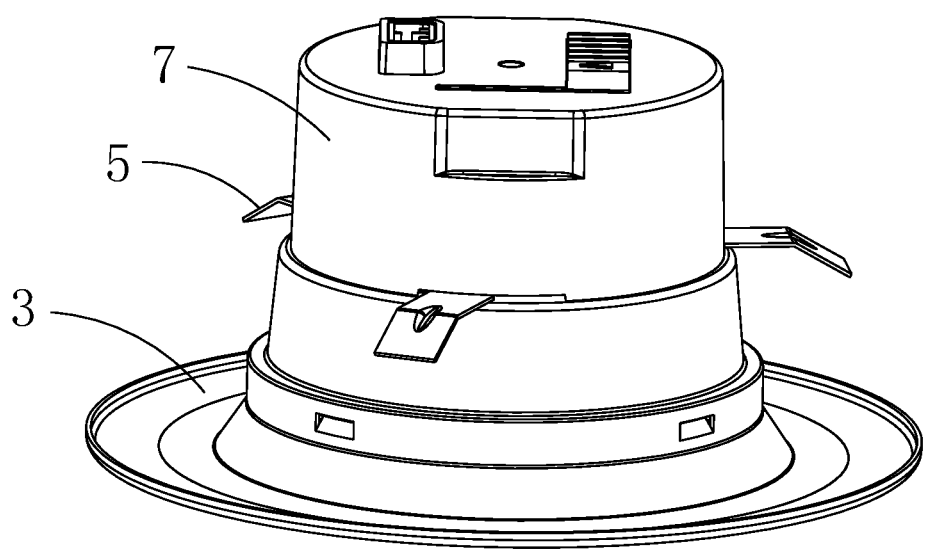
FIG. 2 illustrates a side view of the downlight apparatus of FIG. 1.

FIG. 2 illustrates a side view of the downlight apparatus of FIG. 1.

Figure 3:
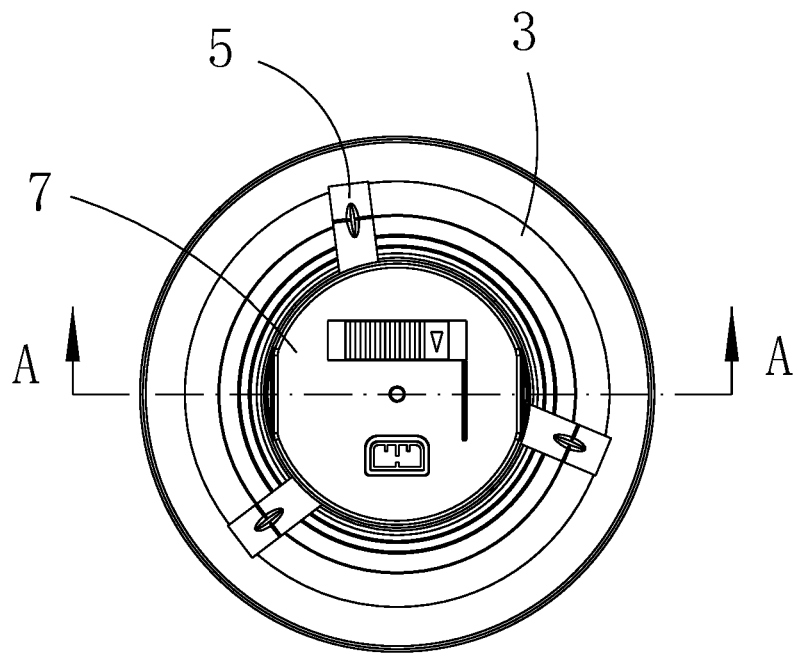
FIG. 3 illustrates a top view of the downlight apparatus of FIG. 1.

FIG. 3 illustrates a top view of the downlight apparatus of FIG. 1.

Figure 4:
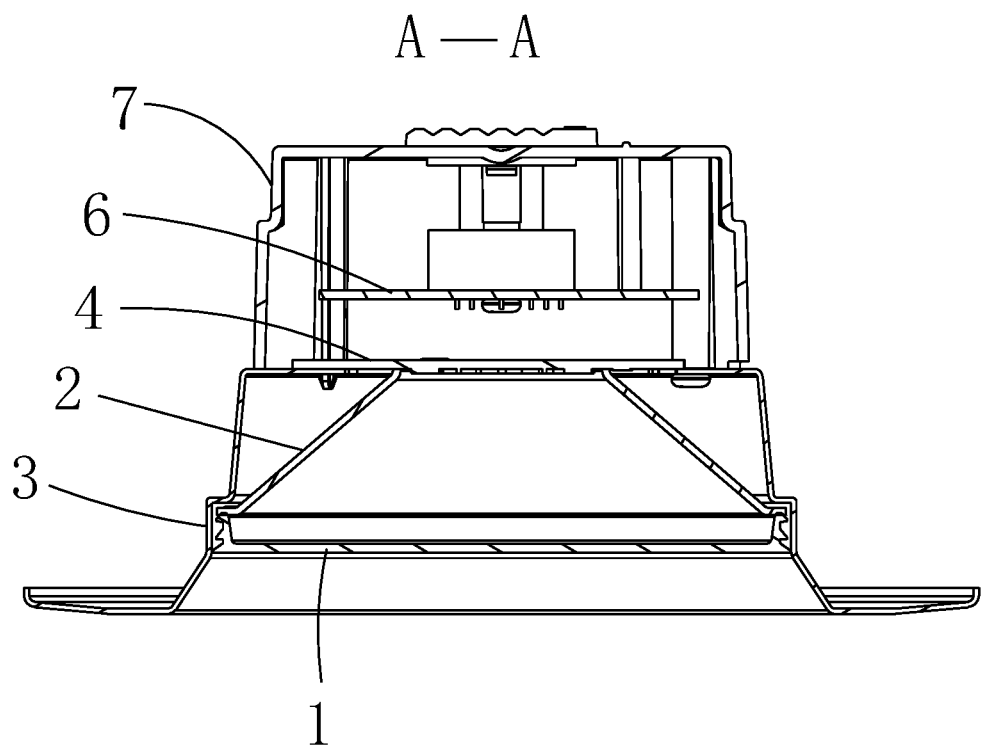
FIG. 4 illustrates a cross-sectional view of the example in FIG. 1.

FIG. 4 illustrates a cross-sectional view of the example in FIG. 1.

Figure 5:
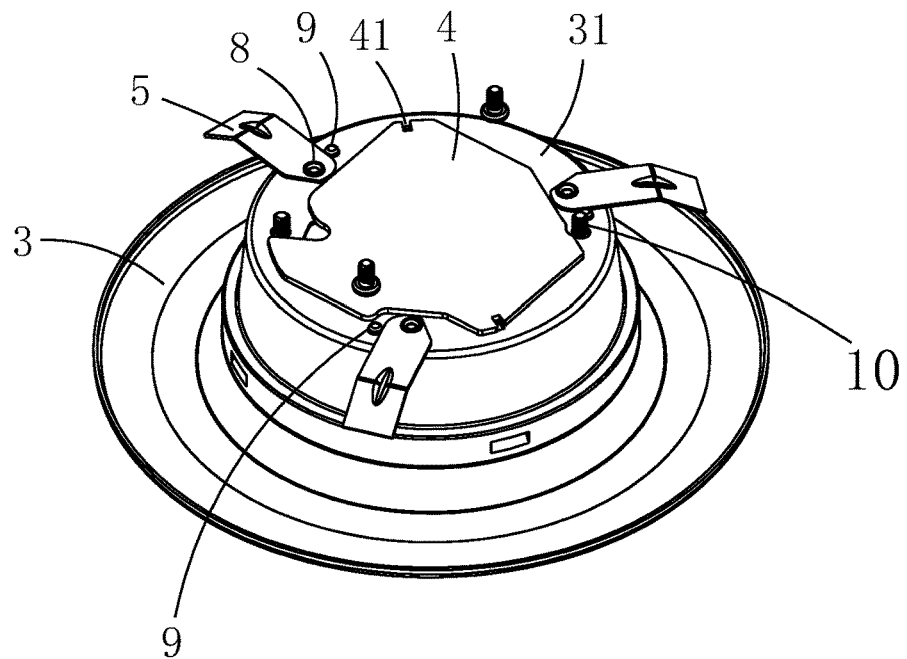
FIG. 5 illustrates a perspective view of the leaf spring and the light housing.

FIG. 5 illustrates a perspective view of the leaf spring and the light housing.

Figure 6:
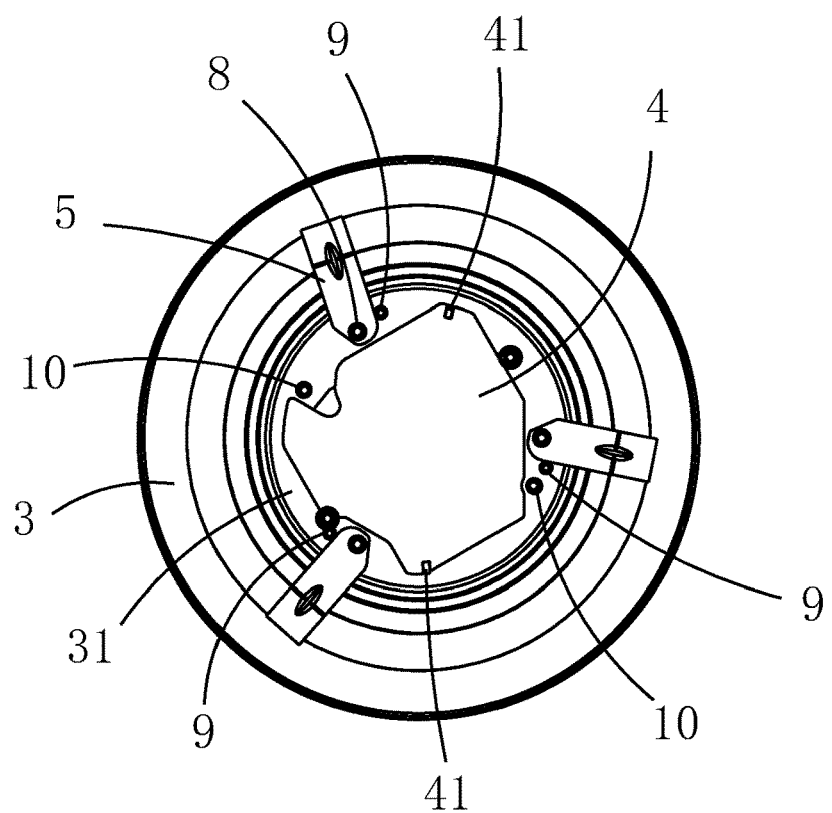
FIG. 6 illustrates a top view of the example in FIG. 5.

FIG. 6 illustrates a top view of the example in FIG. 5.

Figure 7:
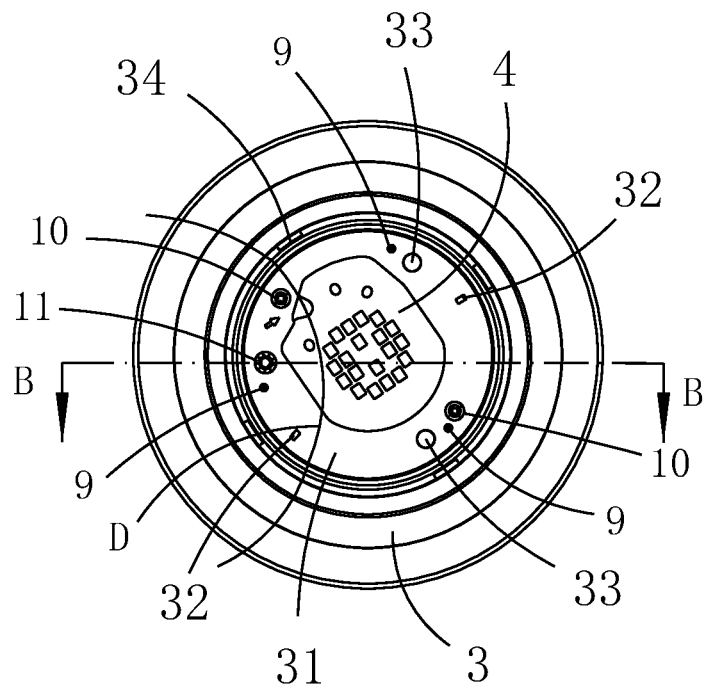
FIG. 7 illustrates a bottom view of the example in FIG. 5.

FIG. 7 illustrates a bottom view of the example in FIG. 5.

Figure 8:
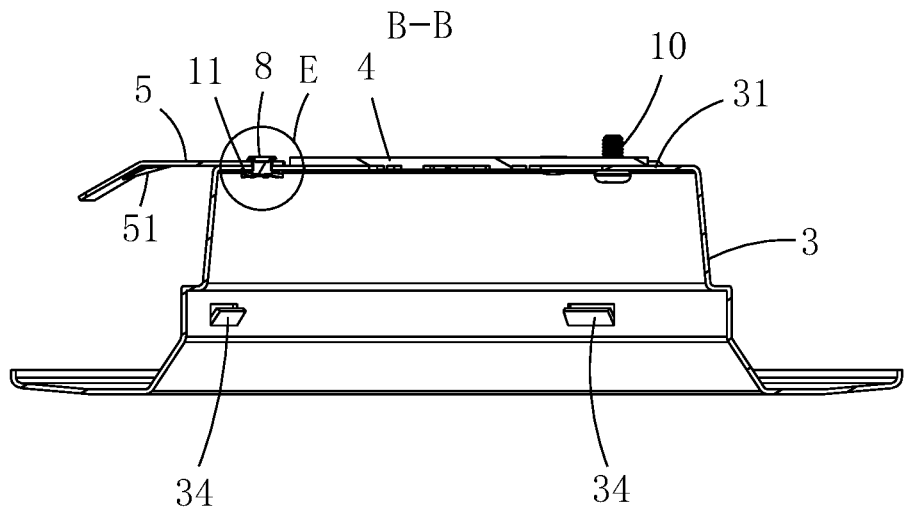
FIG. 8 illustrates a side view of the example in FIG. 5.

FIG. 8 illustrates a side view of the example in FIG. 5.

Figure 9:
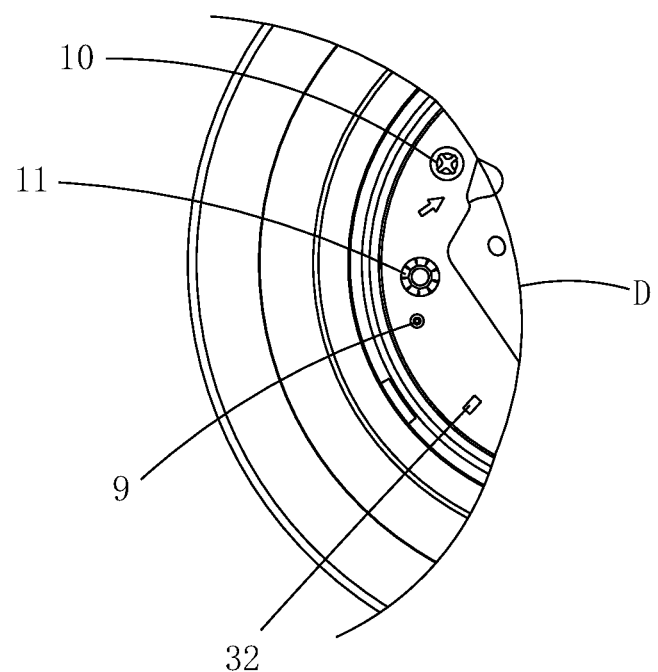
FIG. 9 illustrates a zoom-up view of a portion of the example in FIG. 5.

FIG. 9 illustrates a zoom-up view of a portion of the example in FIG. 5.

Figure 10:
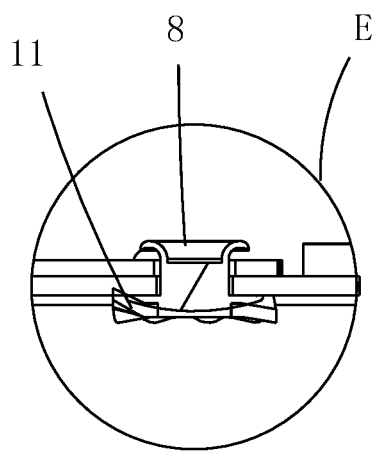
FIG. 10 illustrates a zoom-up view of a connection among multiple components.

FIG. 10 illustrates a zoom-up view of a connection among multiple components.

Figure 11:
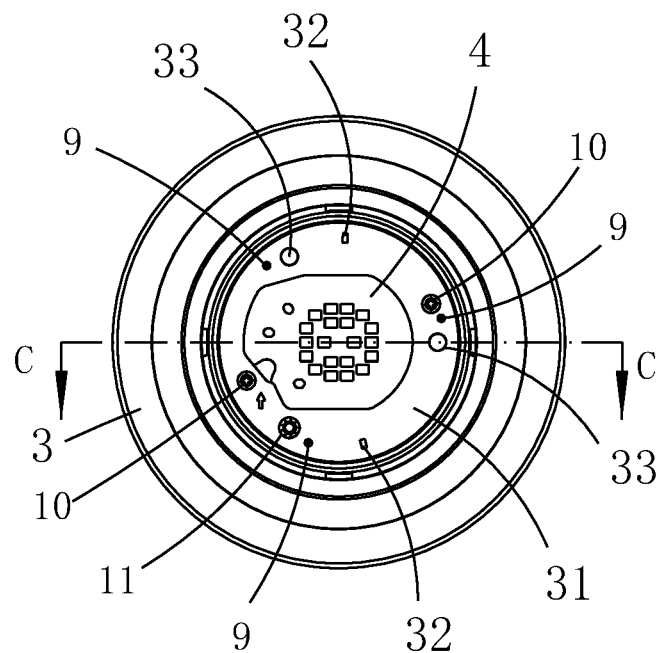
FIG. 11 illustrates another bottom view of another example.

FIG. 11 illustrates another bottom view of another example.

Figure 12:
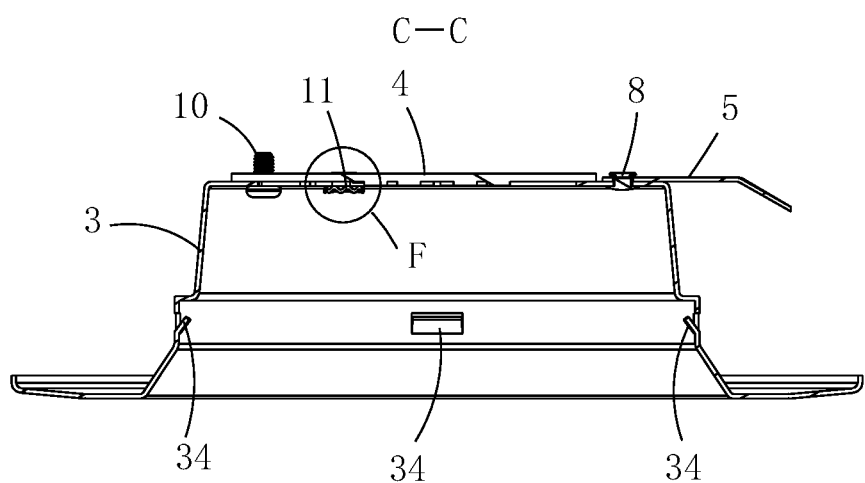
FIG. 12 illustrates a side view of another example.

FIG. 12 illustrates a side view of another example.

Figure 13:
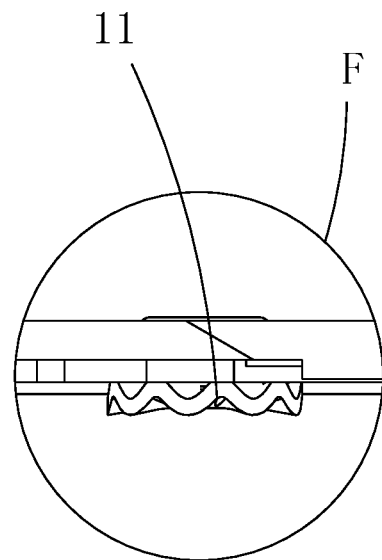
FIG. 13 illustrates a wave structure pad example.

FIG. 13 illustrates a wave structure pad example.

Figure 14:
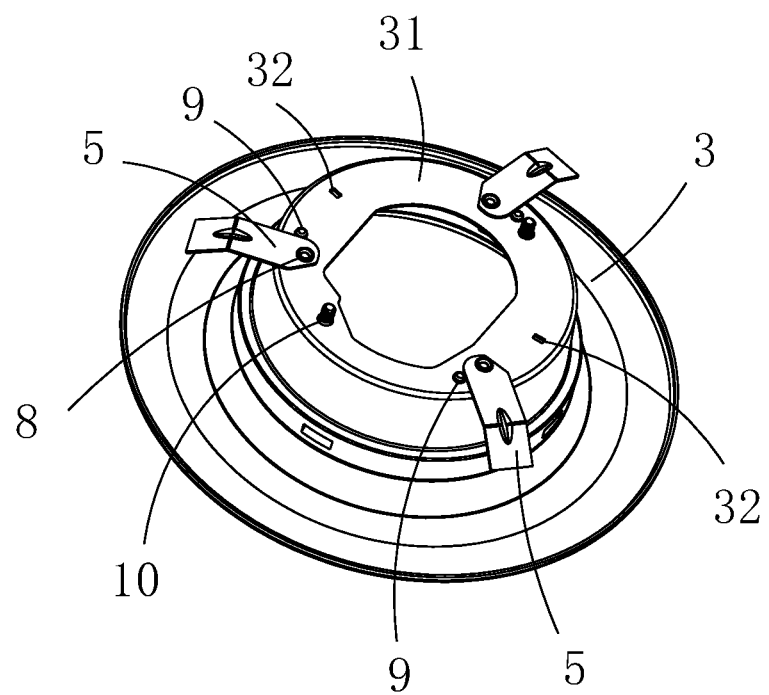
FIG. 14 illustrates another example of a light housing.

FIG. 14 illustrates another example of a light housing.

Figure 15:
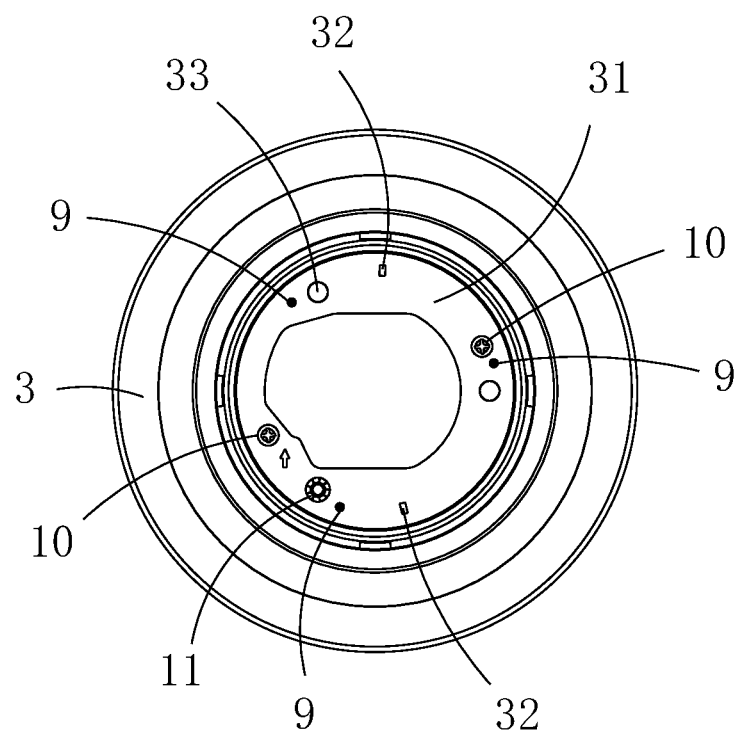
FIG. 15 illustrates a top view of the example in FIG. 14.

FIG. 15 illustrates a top view of the example in FIG. 14.

Figure 16:
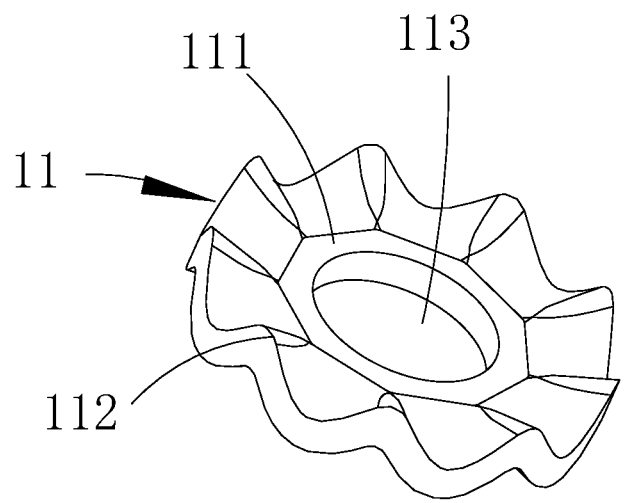
FIG. 16 illustrates an example of a wave structure pad.

FIG. 16 illustrates an example of a wave structure pad.

Figure 17:
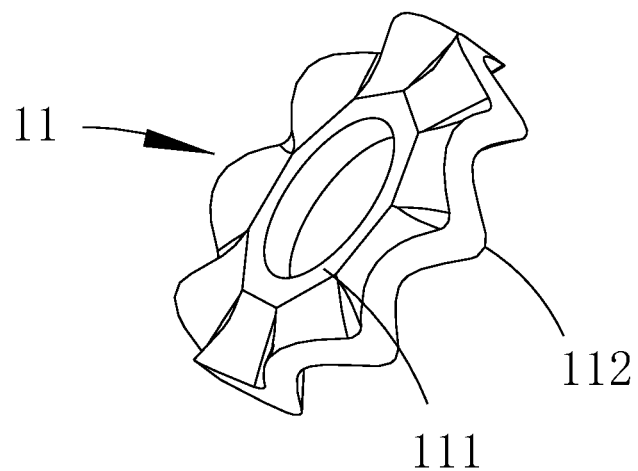
FIG. 17 illustrates another view of the example in FIG. 16.

FIG. 17 illustrates another view of the example in FIG. 16.

FIG. 18 illustrates another view of the example in FIG. 16.

Figure 19:
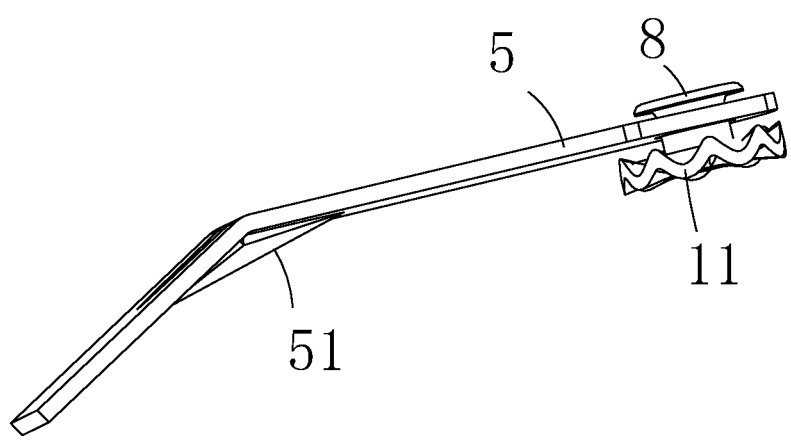
FIG. 19 illustrates a combination of the shaft connector, the leaf spring and the pad.

FIG. 19 illustrates a combination of the shaft connector, the leaf spring and the pad.

Figure 20:
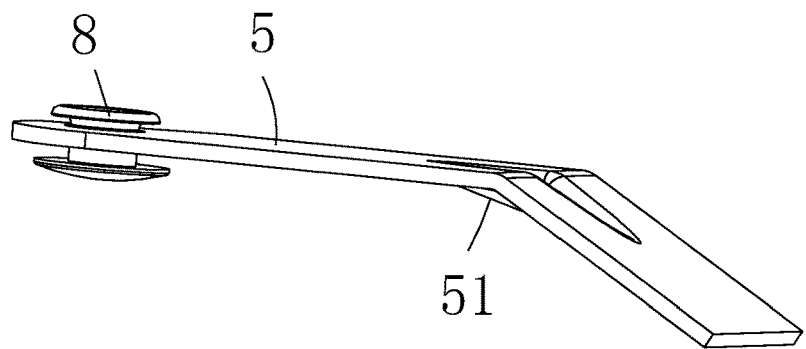
FIG. 20 illustrates another view of the example in FIG. 19.

FIG. 20 illustrates another view of the example in FIG. 19.

Figure 21:
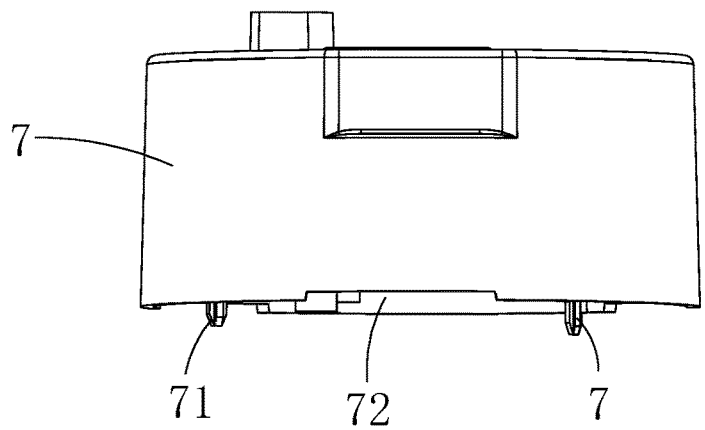
FIG. 21 illustrates a driver box example.

FIG. 21 illustrates a driver box example.

Figure 22:
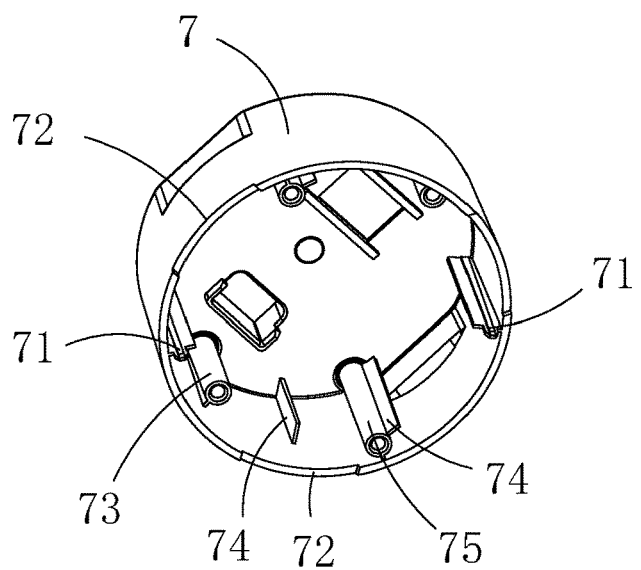
FIG. 22 illustrates another view of the example in FIG. 21.

FIG. 22 illustrates another view of the example in FIG. 21.

Figure 23:
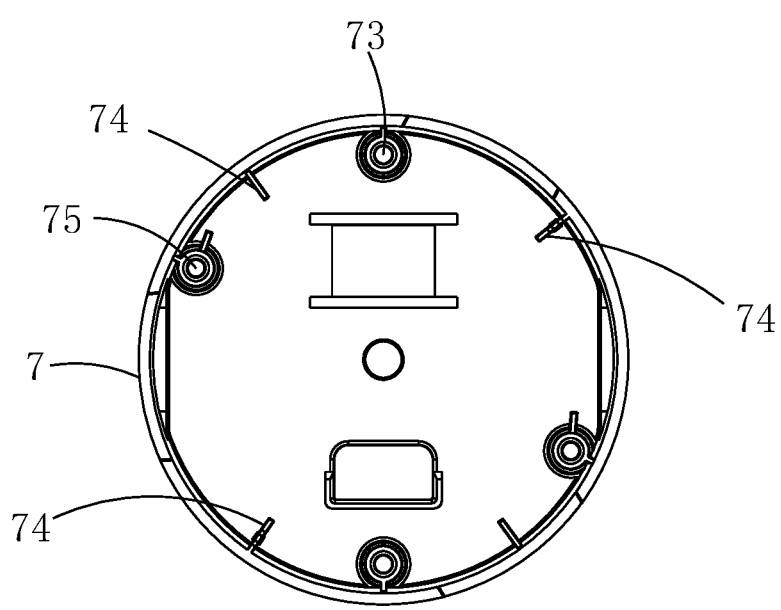
FIG. 23 illustrates another view of the example in FIG. 21.

FIG. 23 illustrates another view of the example in FIG. 21.

Figure 24:
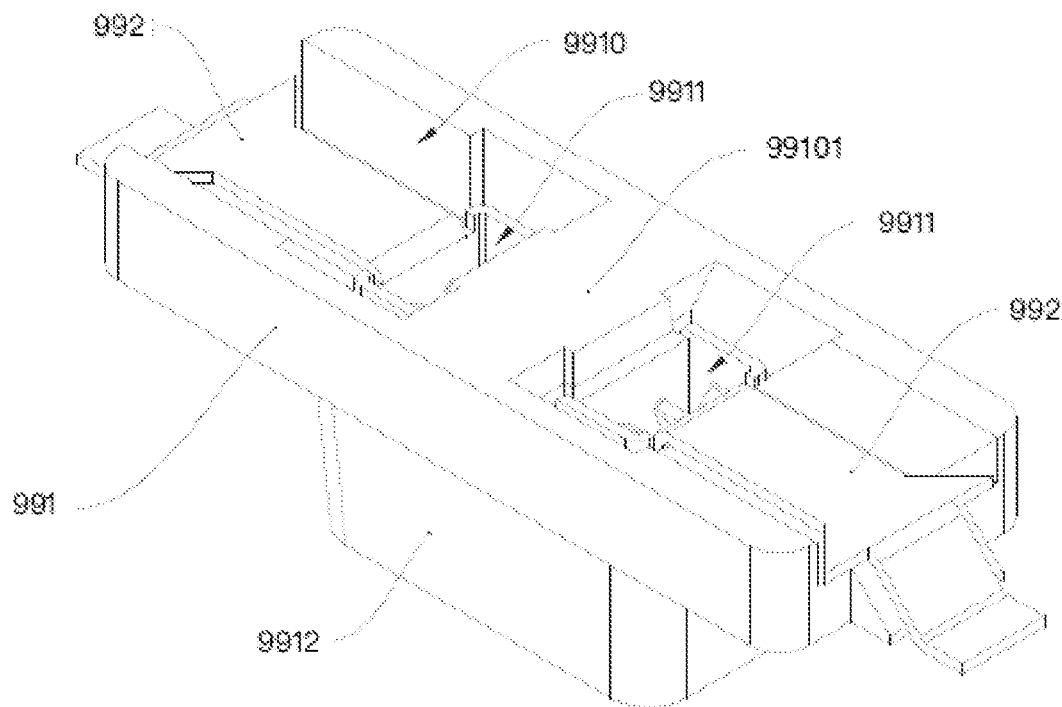
FIG. 24 illustrates a connector example.

FIG. 24 illustrates a connector example.

Figure 25:
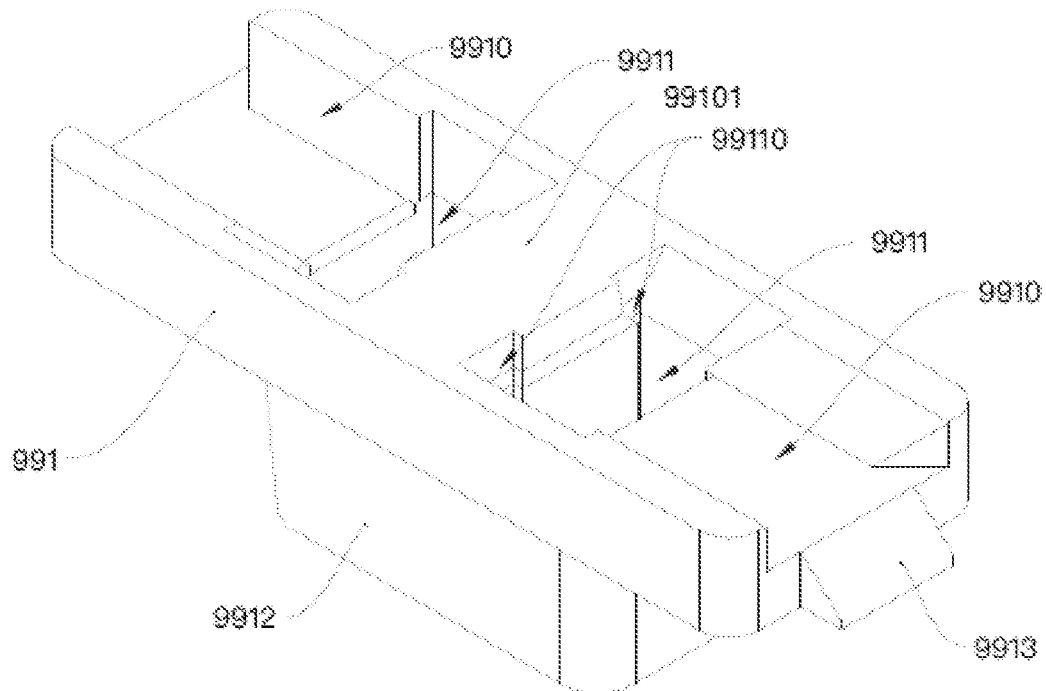
FIG. 25 illustrates a component in FIG. 24.

FIG. 25 illustrates a component in FIG. 24.

Figure 26:
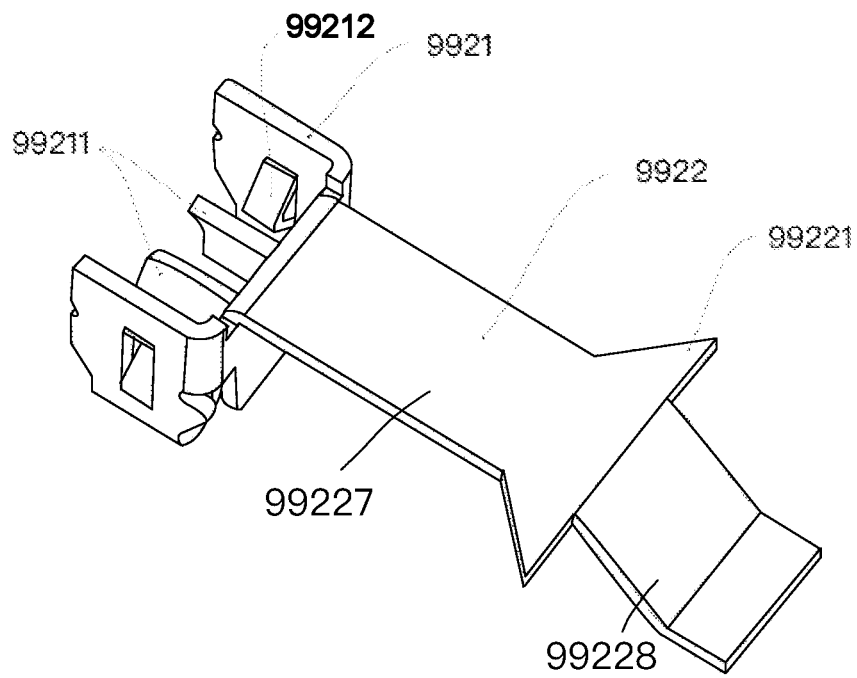
FIG. 26 illustrates another component in FIG. 24.

FIG. 26 illustrates another component in FIG. 24.

Figure 27:
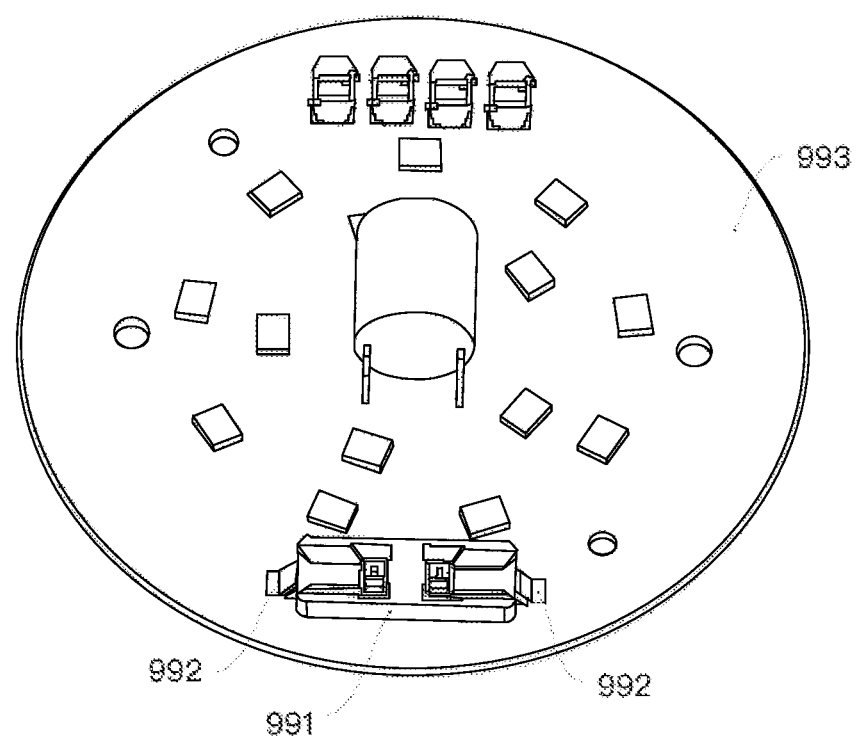
FIG. 27 illustrates the connector disposed on a light source plate.

FIG. 27 illustrates the connector disposed on a light source plate.

Figure 28:
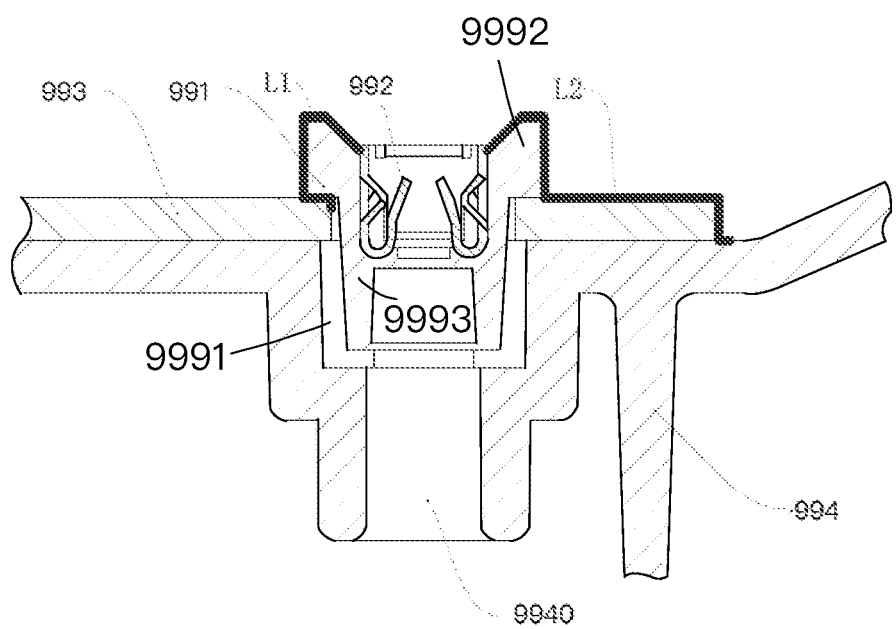
FIG. 28 illustrates an electricity distance diagram.

FIG. 28 illustrates an electricity distance diagram.

Figure 29:
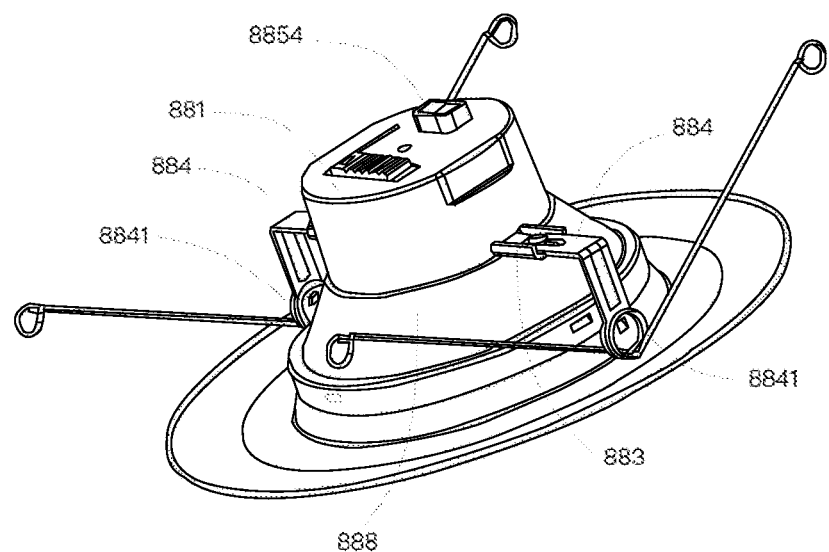
FIG. 29 illustrates another downlight example.

FIG. 29 illustrates another downlight example.

Figure 30:
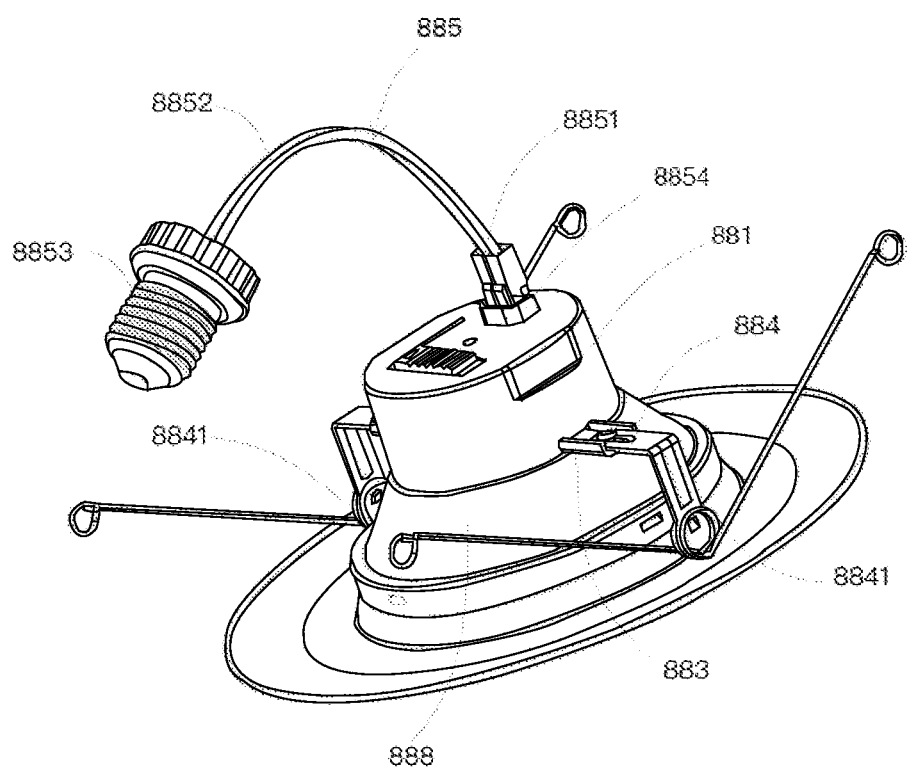
FIG. 30 illustrates the example in FIG. 29 with a wire connector.

FIG. 30 illustrates the example in FIG. 29 with a wire connector.

Figure 31:
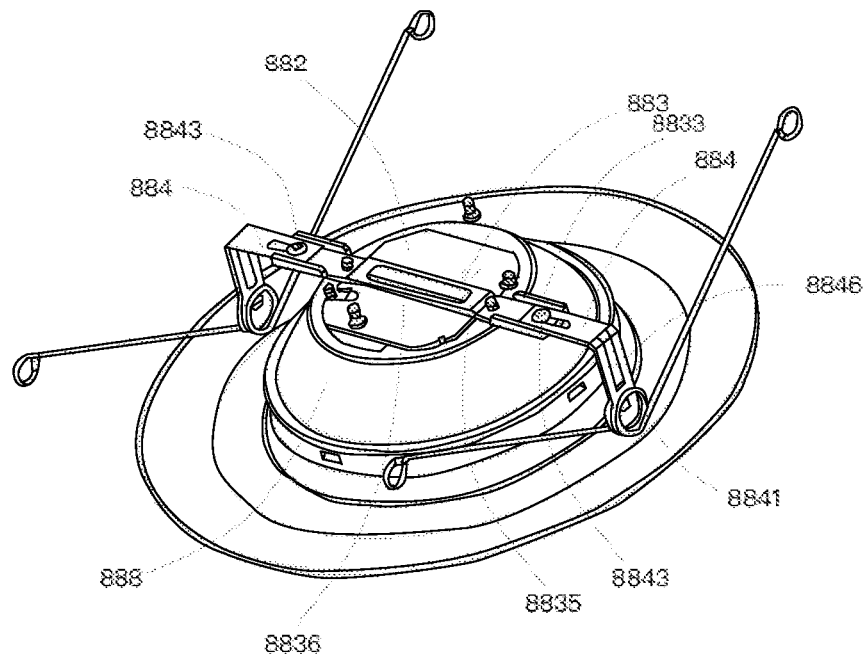
FIG. 31 illustrates a fixing bar placed on a light housing.

FIG. 31 illustrates a fixing bar placed on a light housing.

Figure 32:
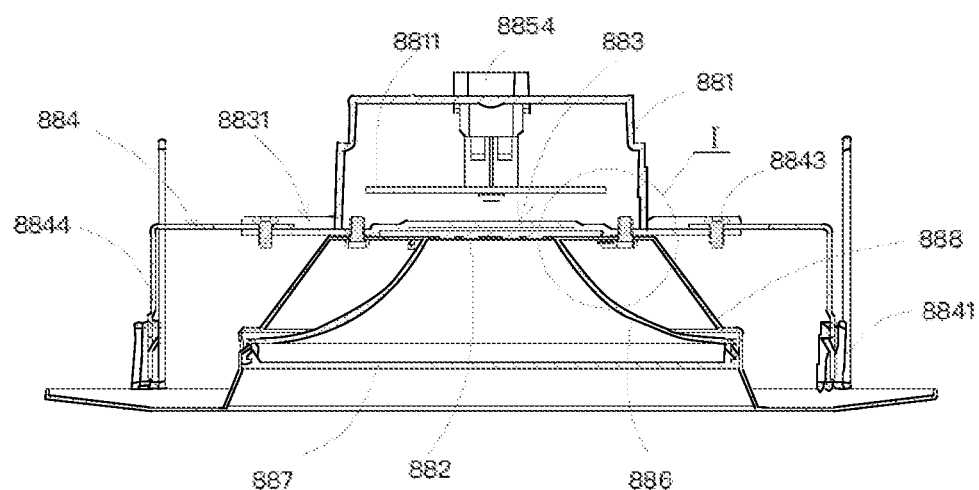
FIG. 32 illustrates a heat dissipation plate placed between a driver box and a light housing.

FIG. 32 illustrates a heat dissipation plate placed between a driver box and a light housing.

Figure 33:
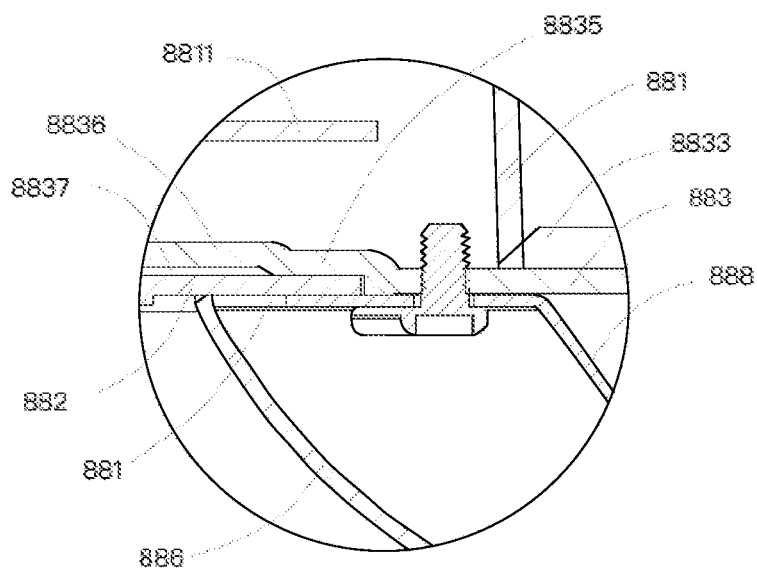
FIG. 33 illustrates a screw for transmitting heat.

FIG. 33 illustrates a screw for transmitting heat.

Figure 34:
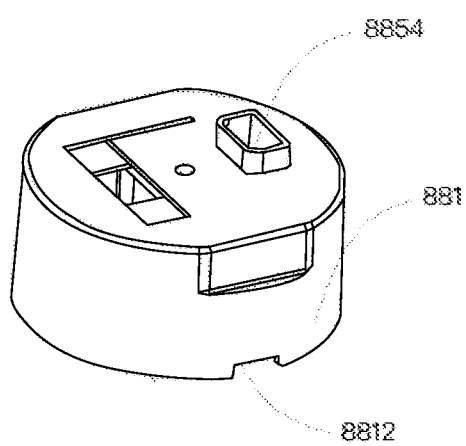
FIG. 34 illustrates a driver box example.

FIG. 34 illustrates a driver box example.

Figure 35:
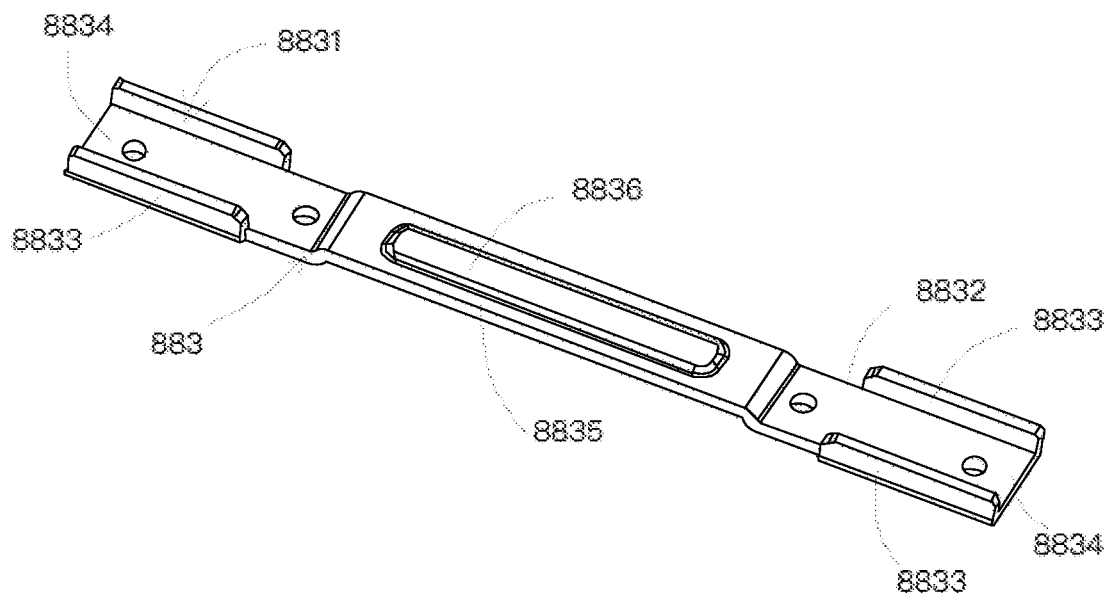
FIG. 35 illustrates a heat dissipation plate in an elongated form.

FIG. 35 illustrates a heat dissipation plate in an elongated form.

Figure 36:
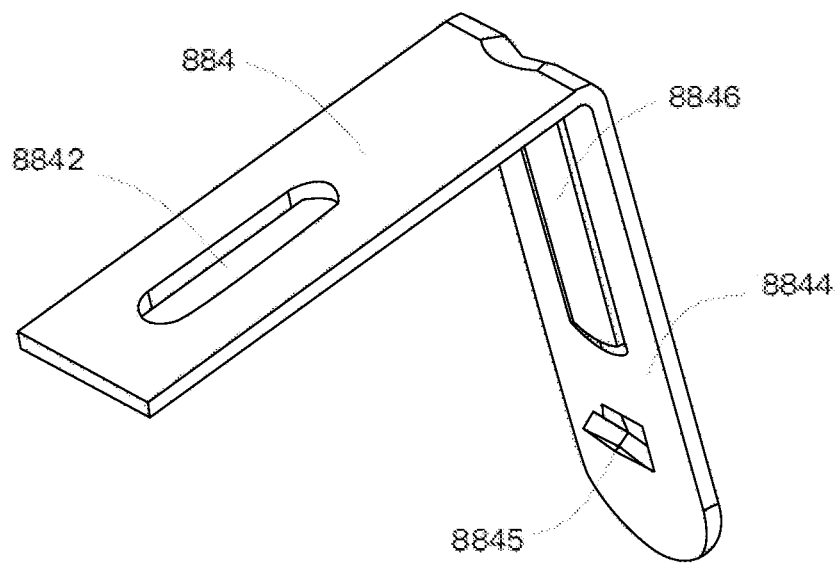
FIG. 36 illustrates a connector for connecting components.

FIG. 36 illustrates a connector for connecting components.

Figure 37:
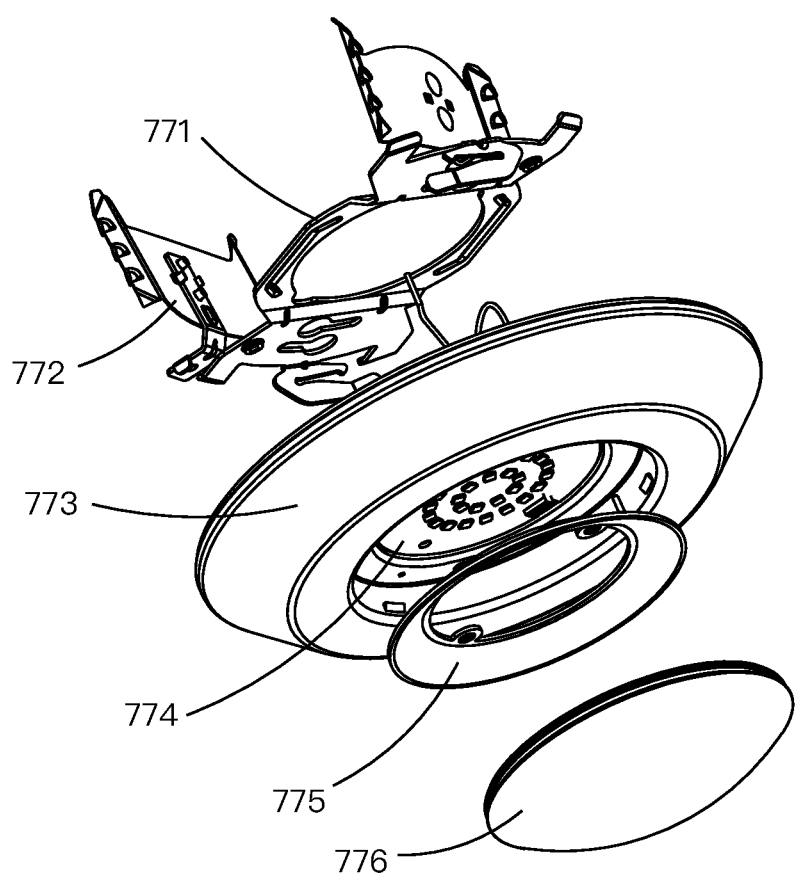
FIG. 37 illustrates an exploded view of another downlight embodiment.

FIG. 37 illustrates an exploded view of another downlight embodiment.

Figure 38:
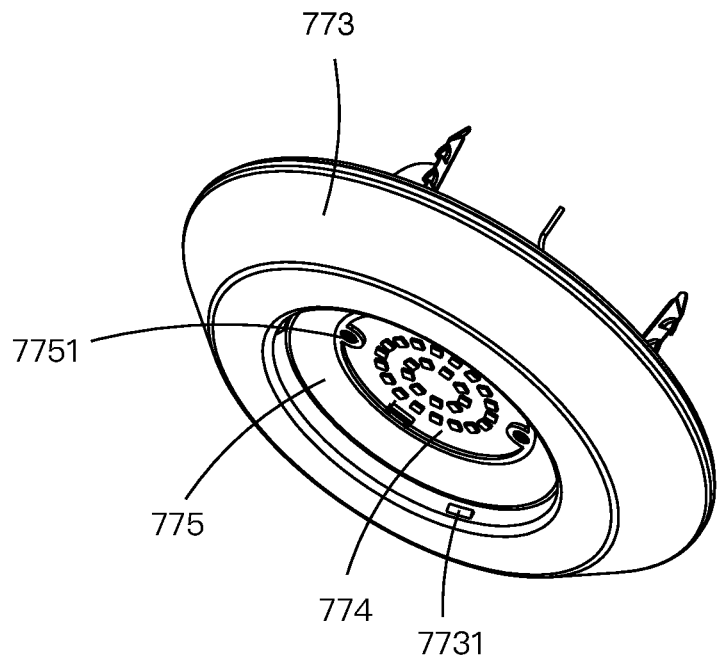
FIG. 38 illustrates a component in the example of FIG. 37.

FIG. 38 illustrates a component in the example of FIG. 37.

Figure 39:
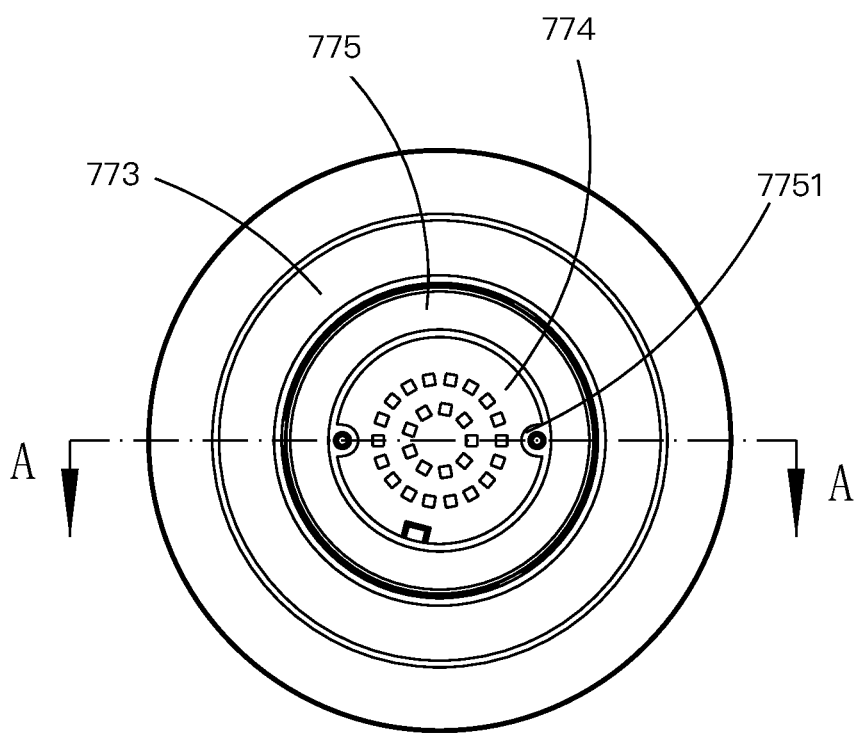
FIG. 39 illustrates a bottom view of the example in FIG. 37.

FIG. 39 illustrates a bottom view of the example in FIG. 37.

Figure 40:
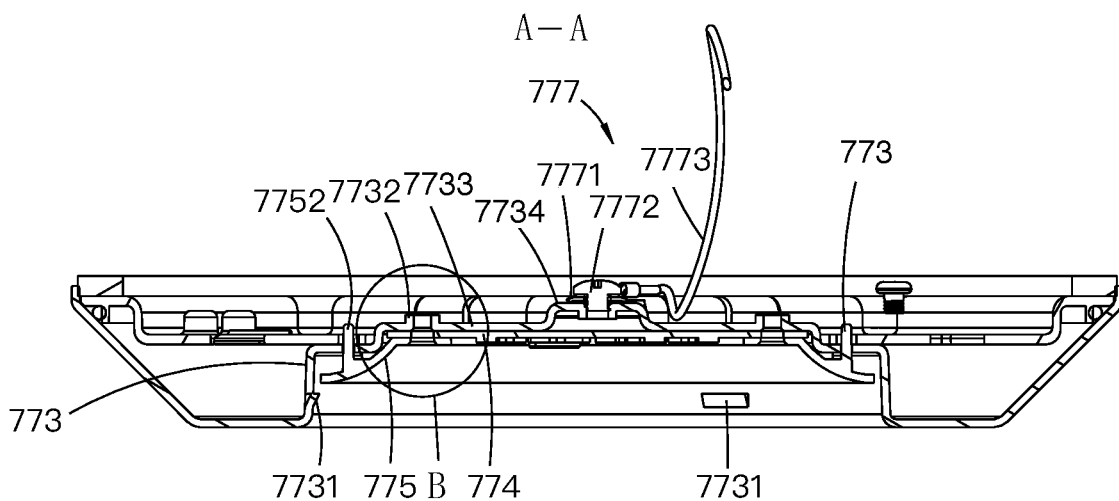
FIG. 40 illustrates another example in a cross-sectional view.

FIG. 40 illustrates another example in a cross-sectional view.

Figure 41:
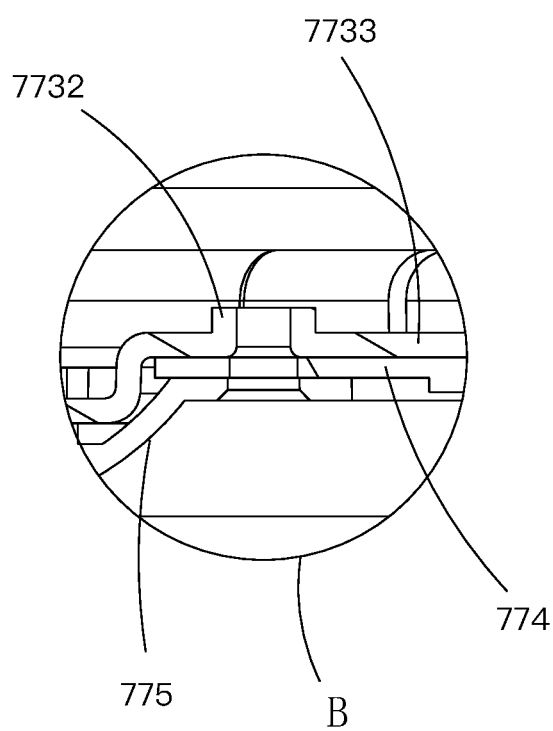
FIG. 41 illustrates a zoom-up view of a connection between components.

FIG. 41 illustrates a zoom-up view of a connection between components.

Figure 42:
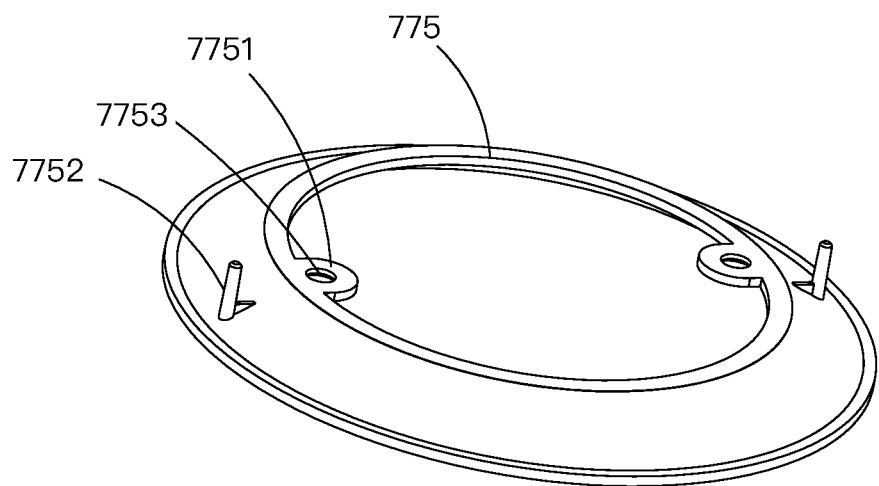
FIG. 42 illustrates a reflective cup example.
Figure 43:
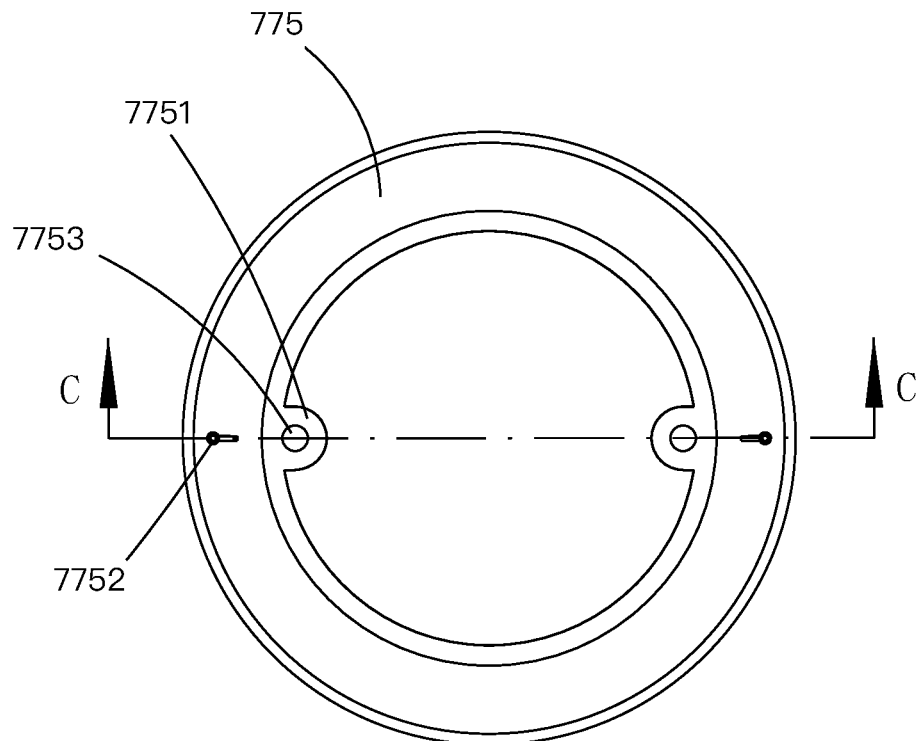
FIG. 43 illustrates a top view of the example in FIG. 42.
Figure 44:
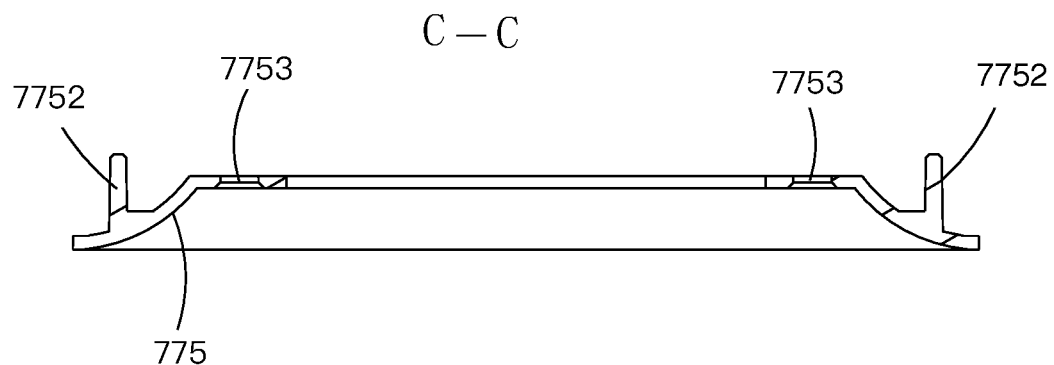
FIG. 44 illustrates a side view of the example in FIG. 42.
Figure 45:
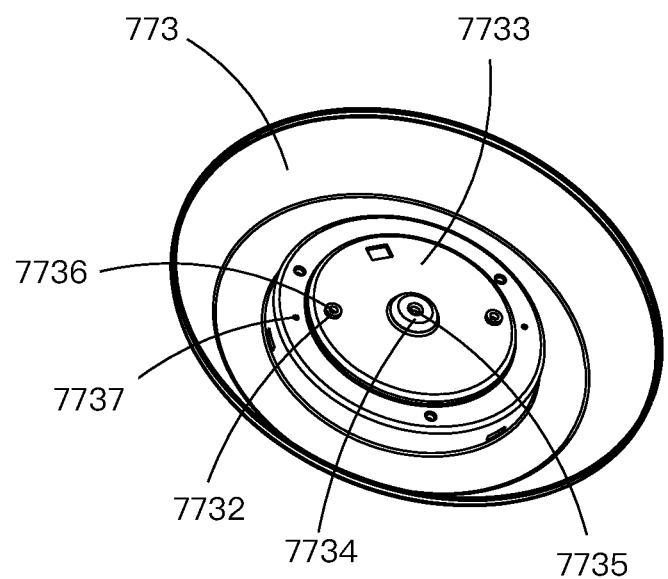
FIG. 45 illustrates a top view of a light housing.
Figure 46:
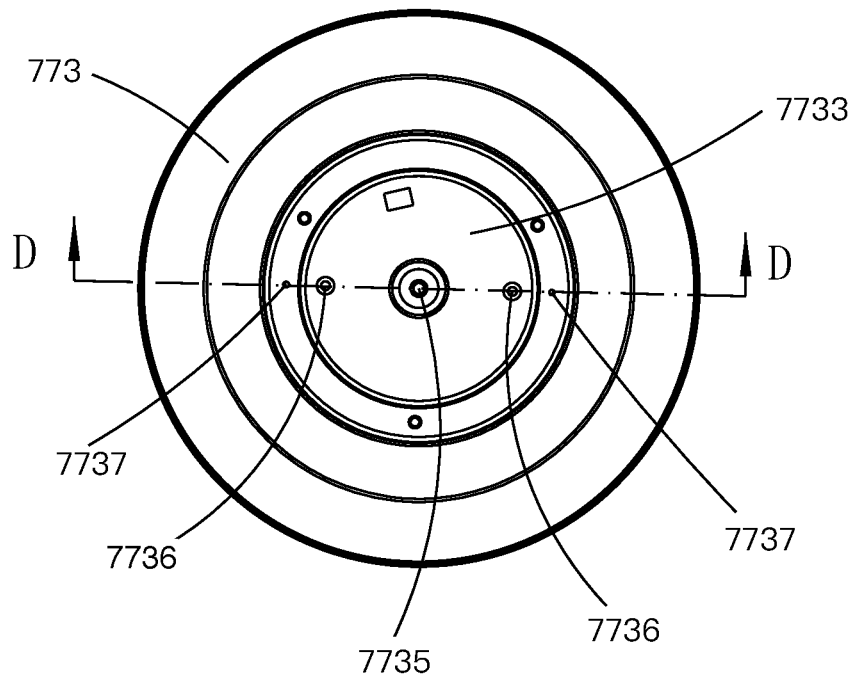
FIG. 46 illustrates another top view of the light housing example in FIG. 45.
Figure 47:
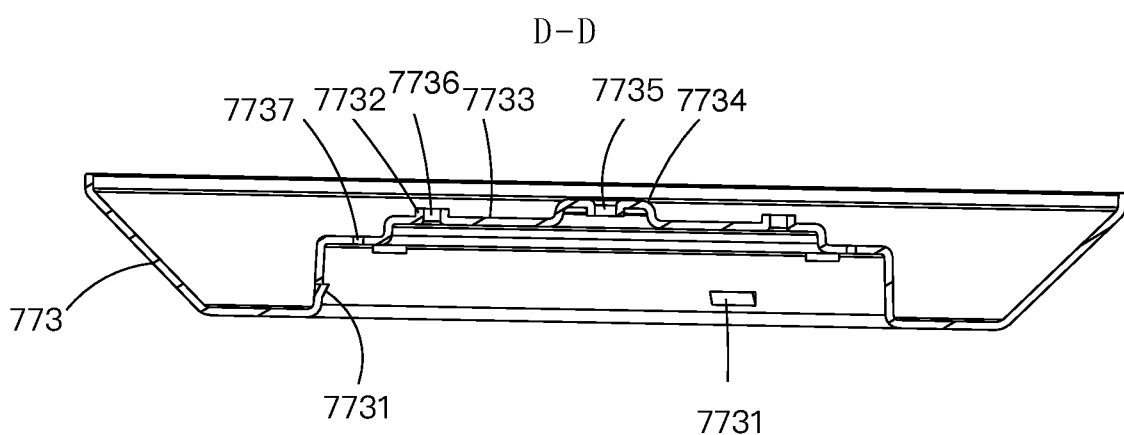
FIG. 47 illustrates a cross-sectional view of the example in FIG. 46.
Figure 48:
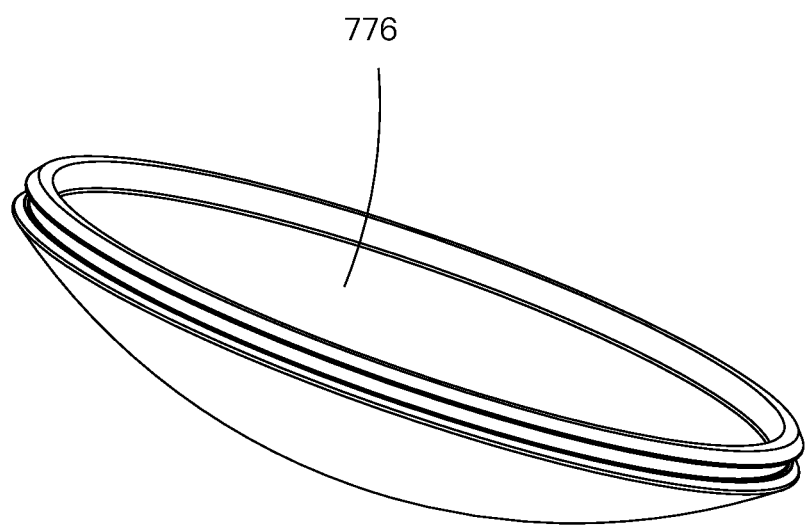
FIG. 48 illustrates a diffusion cover.
Figure 49:
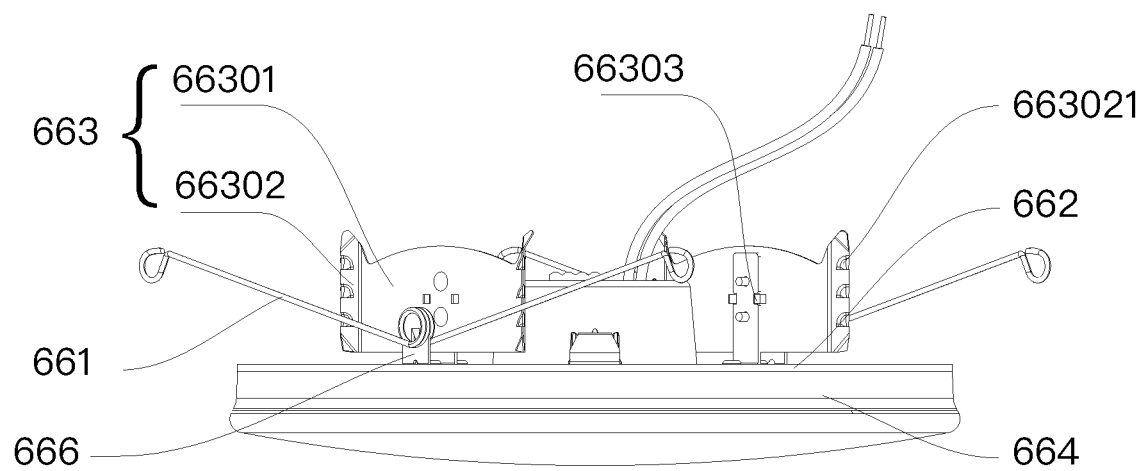
FIG. 49 illustrates a side view of a downlight example.
Figure 50:
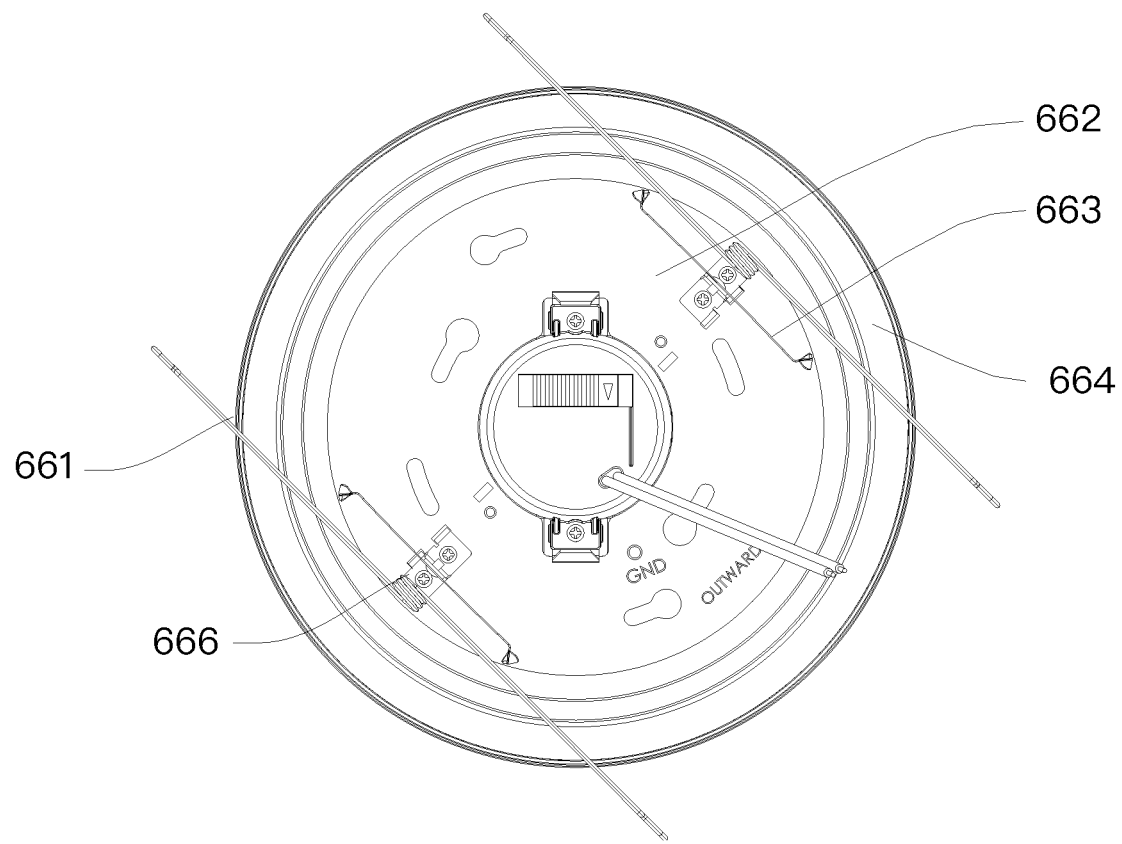
FIG. 50 illustrates a top view of the example in FIG. 49.
Figure 51:
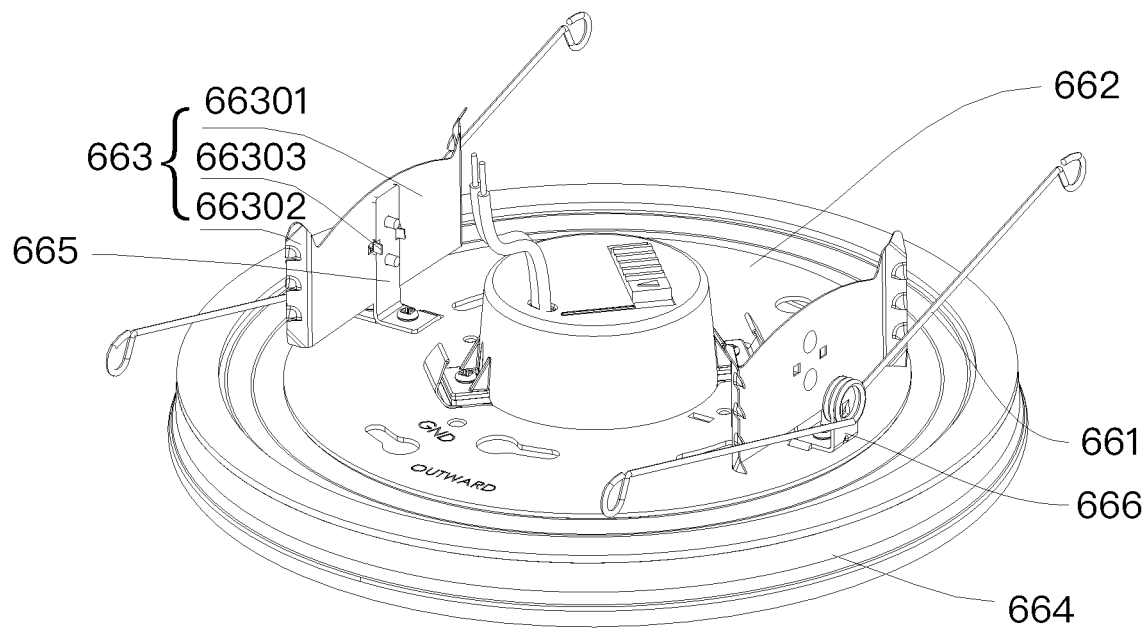
FIG. 51 illustrates another view of the example in FIG. 50.
Figure 52:
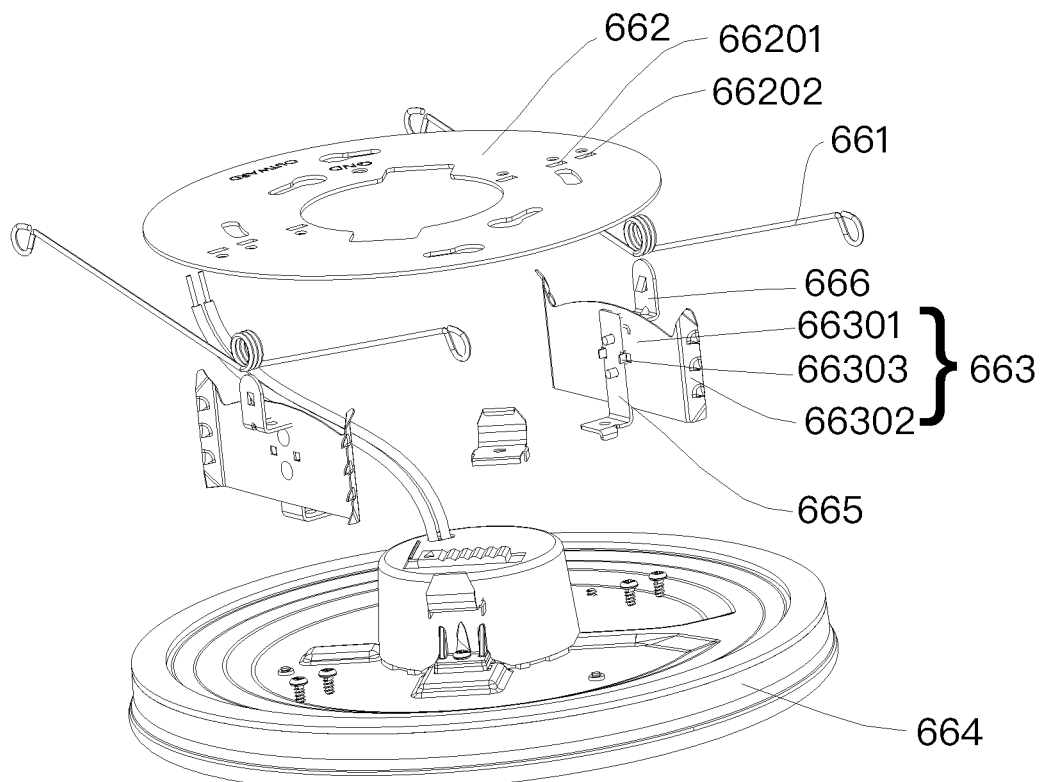
FIG. 52 illustrates an exploded view of the example in FIG. 51.
Figure 53:
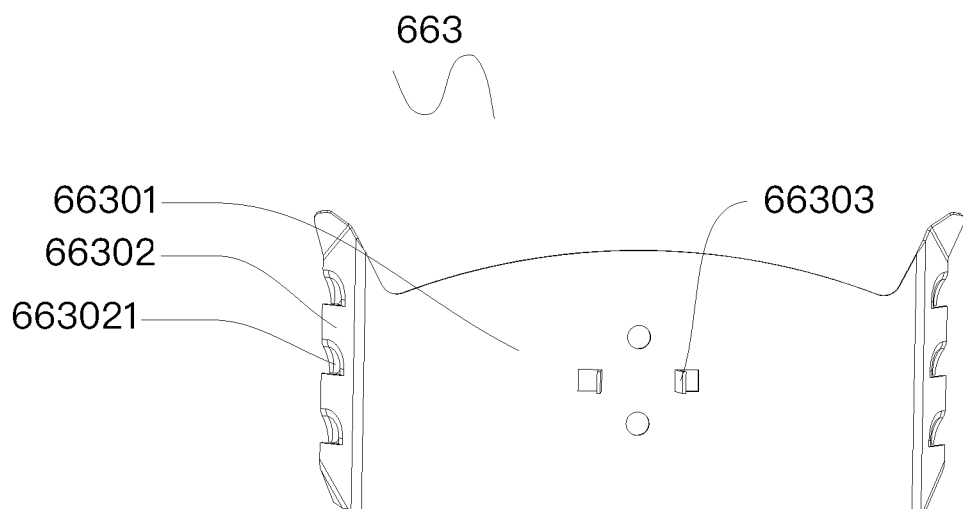
FIG. 53 illustrates an elastic plate example.
Figure 54:
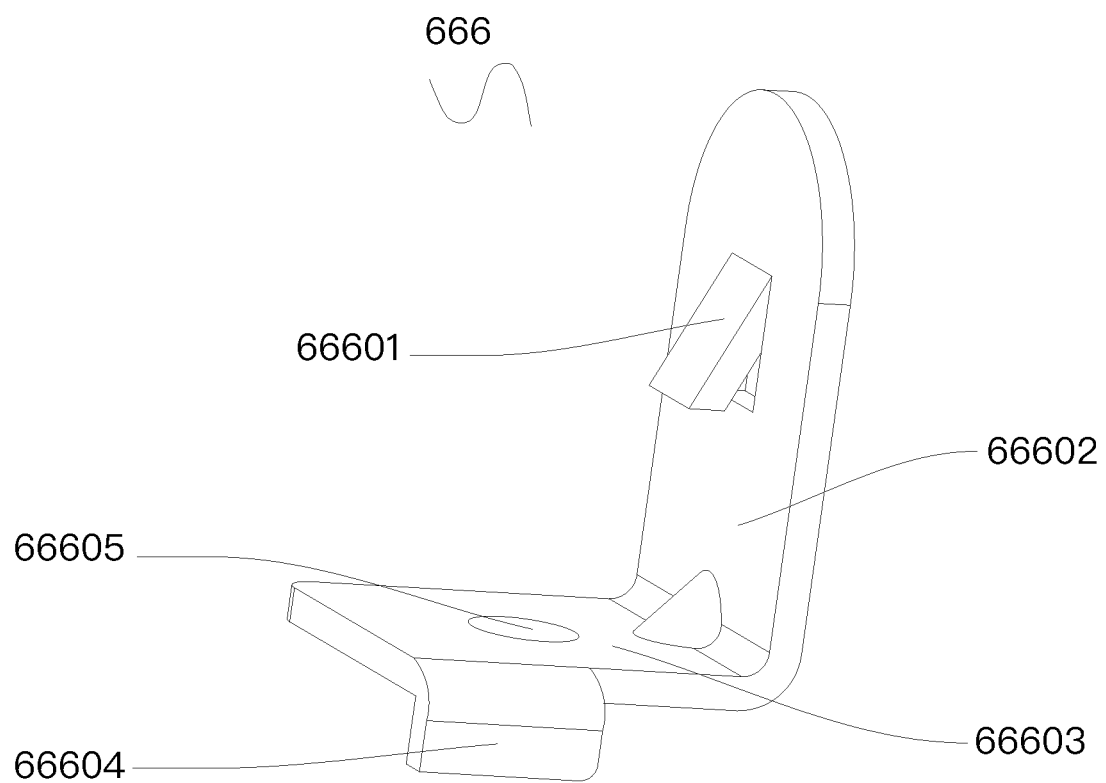
FIG. 54 illustrates a connector example.
Figure 55:
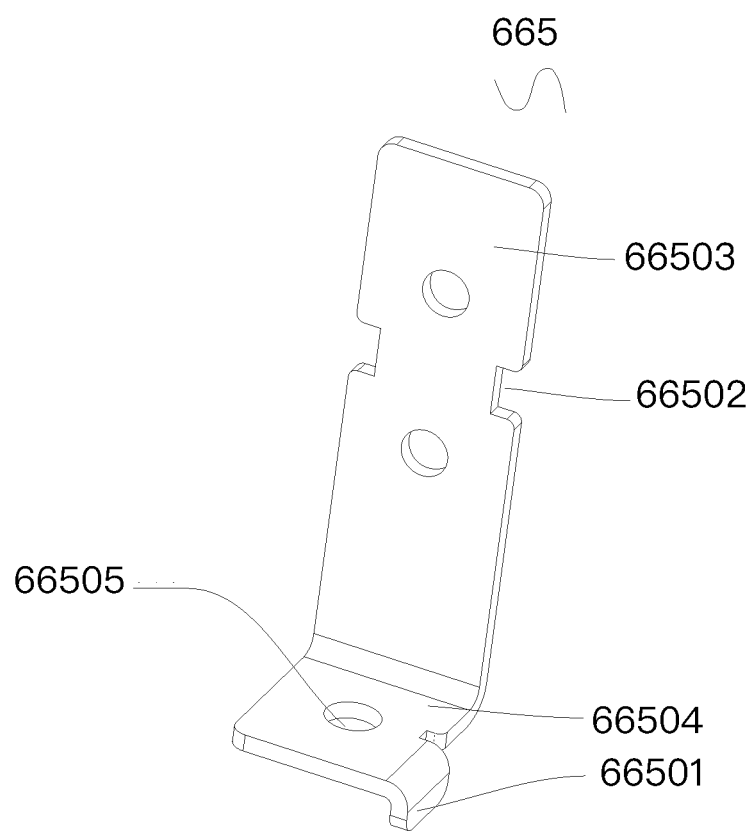
FIG. 55 illustrates another connector example.
Figure 56:
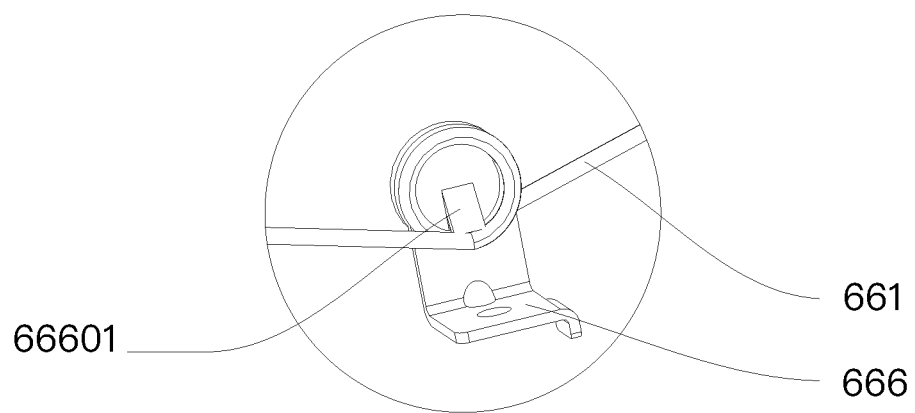
FIG. 56 illustrates a torsion spring zoom-up view.
Figure 58:
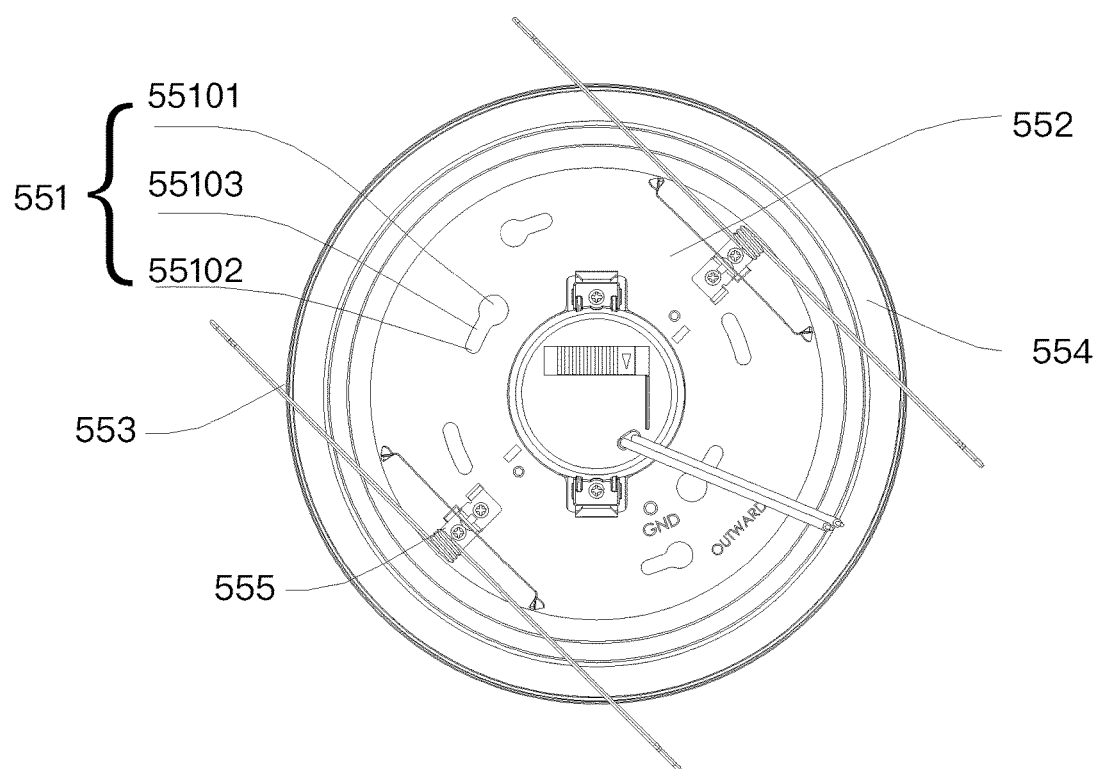
FIG. 58 illustrates a top view of the example in FIG. 57.
Figure 59:
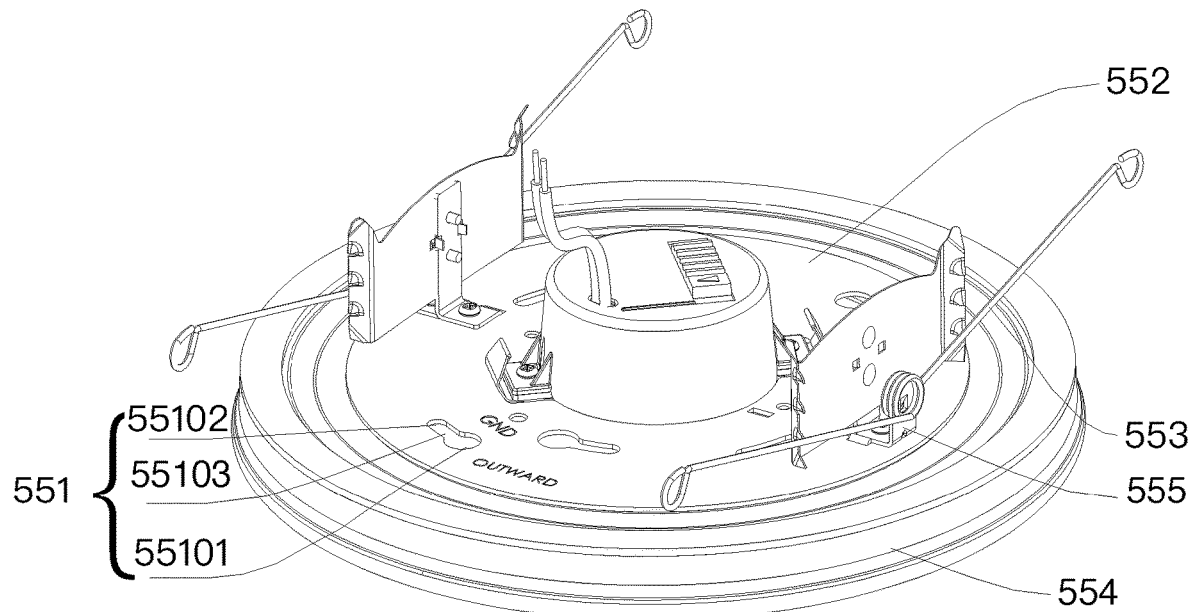
FIG. 59 illustrates another view of the example in FIG. 58.
Figure 60:
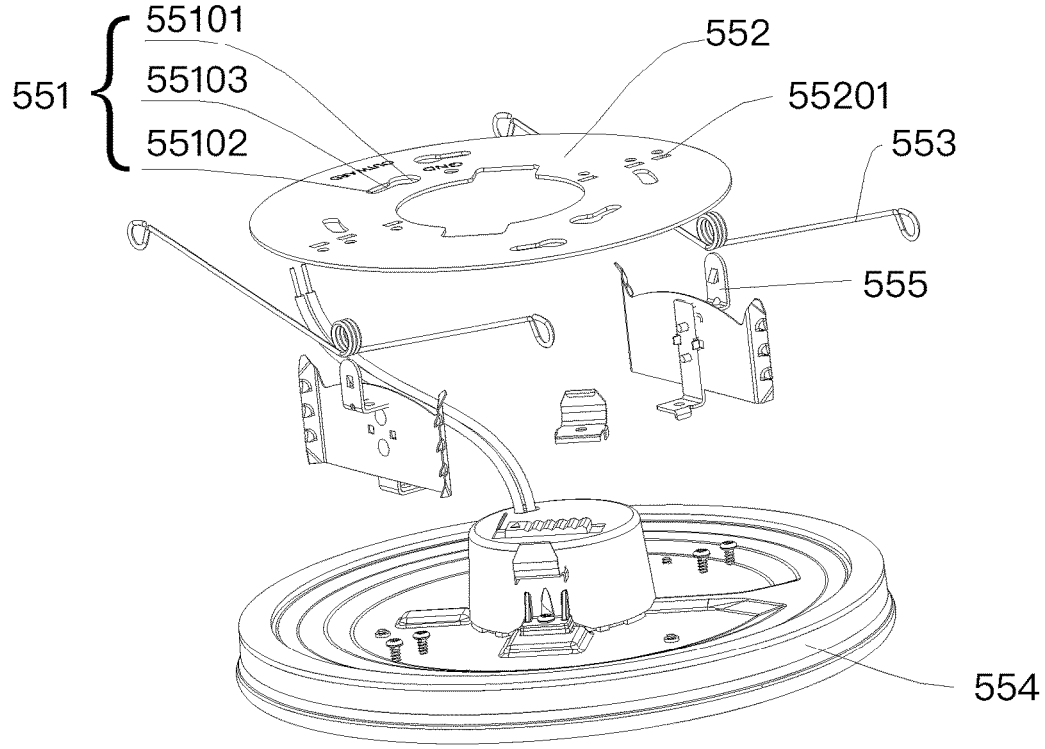
FIG. 60 illustrates an exploded view of the example in FIG. 59.
Figure 61:
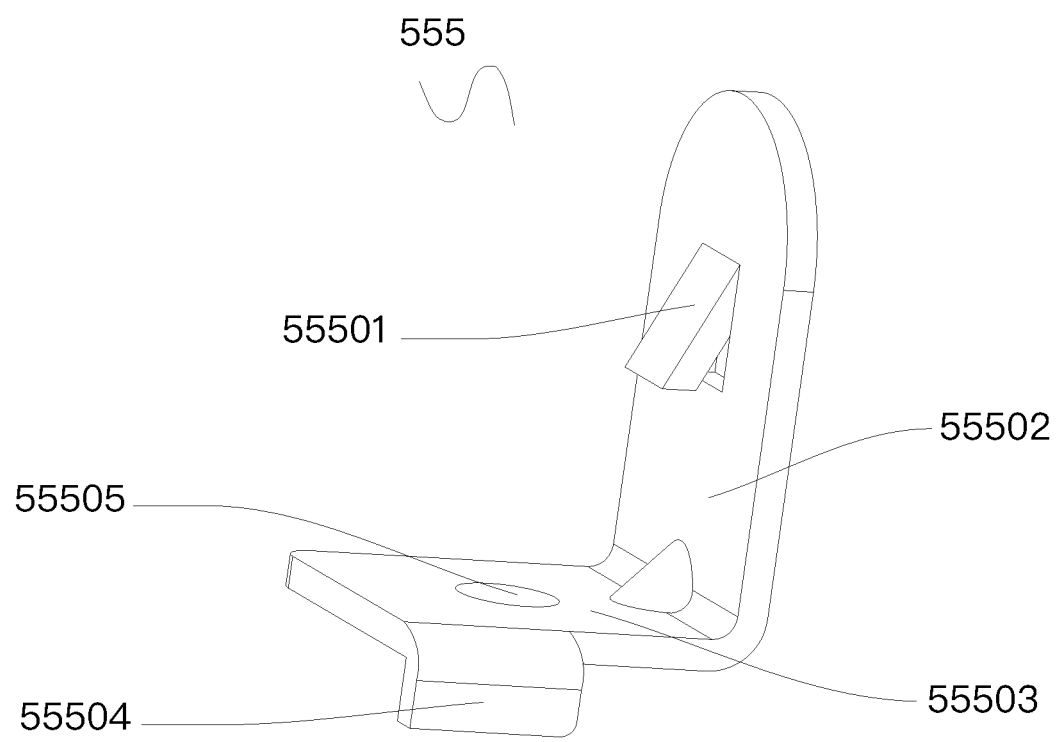
FIG. 61 illustrates a connector example.
Figure 62:
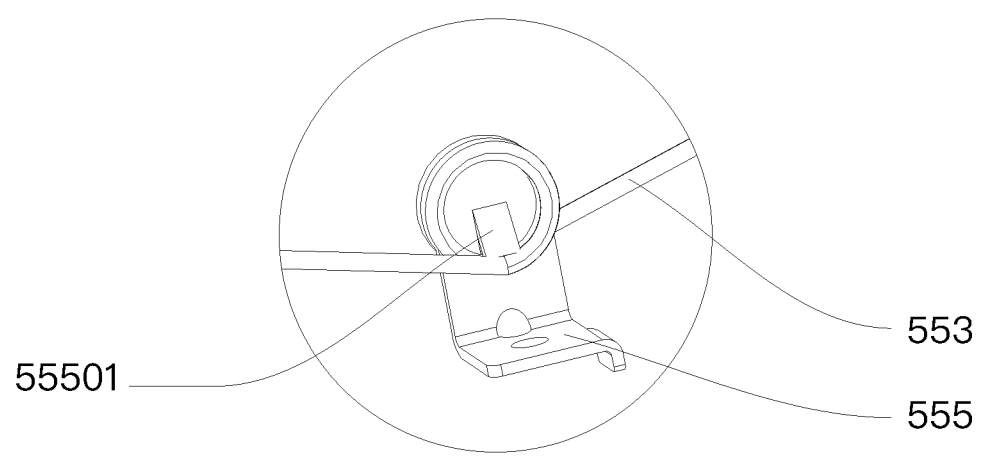
FIG. 62 illustrates a torsion spring zoom-up view.
Figure 63:
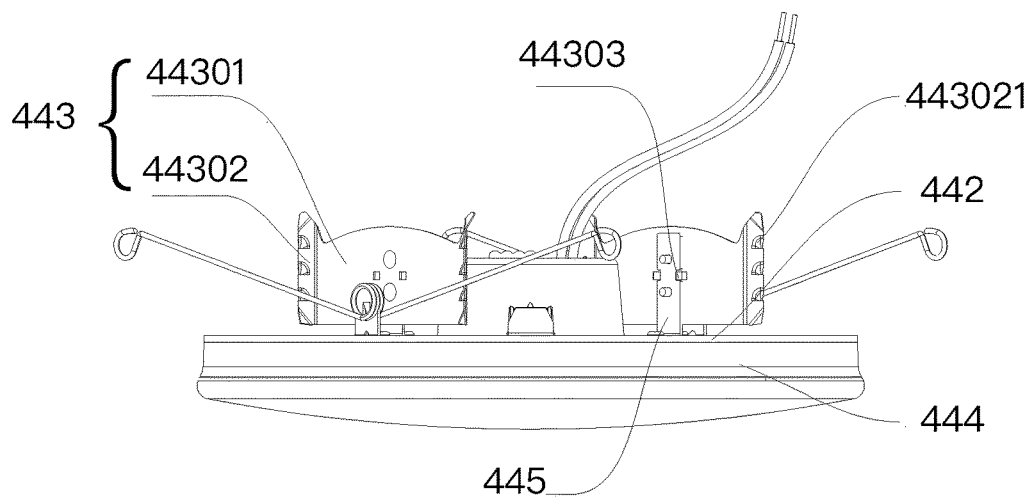
FIG. 63 illustrates another downlight example.
Figure 64:
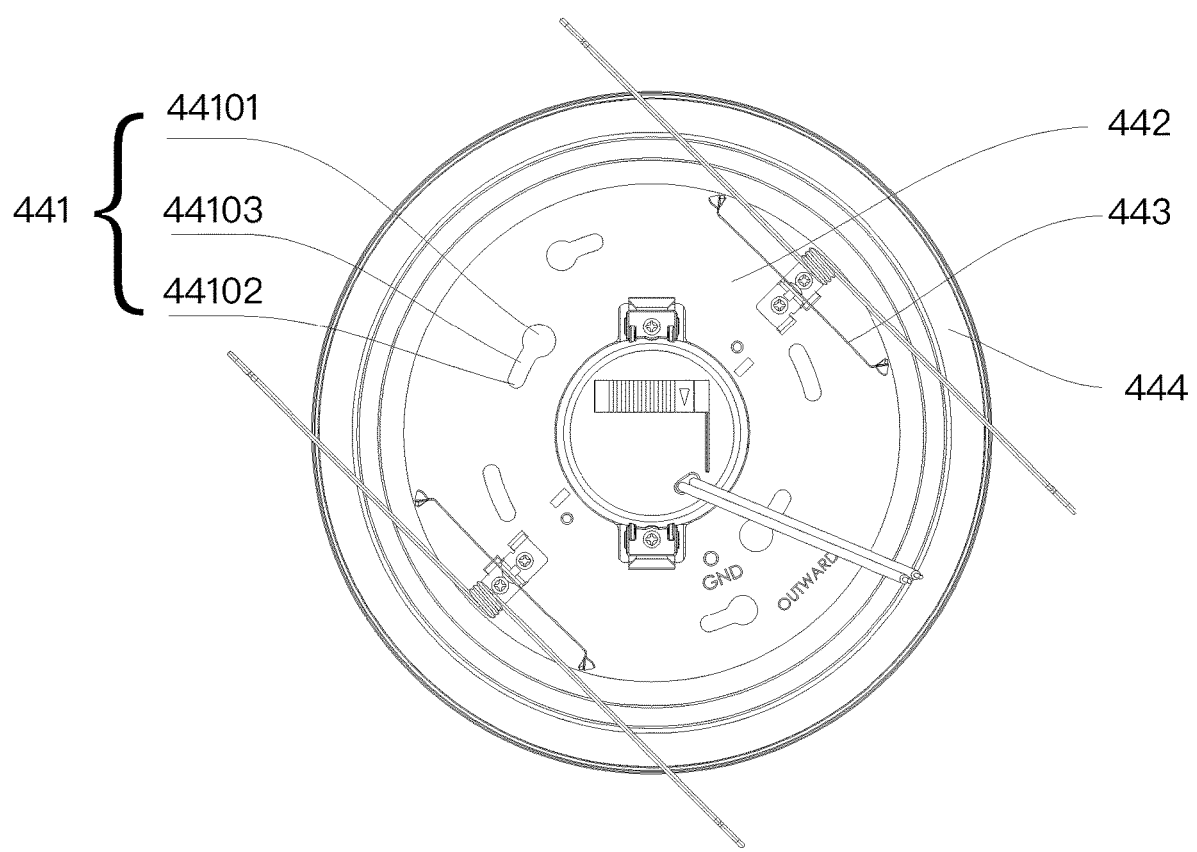
FIG. 64 illustrates a top view of the example in FIG. 63.
Figure 65:
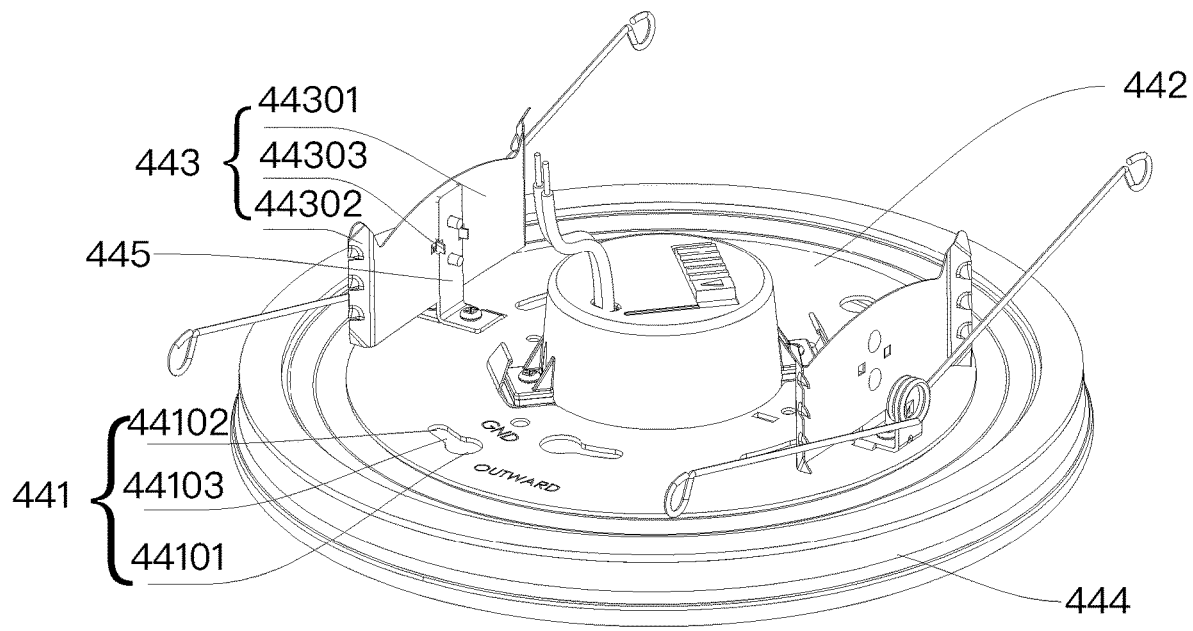
FIG. 65 illustrates another view of the example in FIG. 64.
Figure 68:
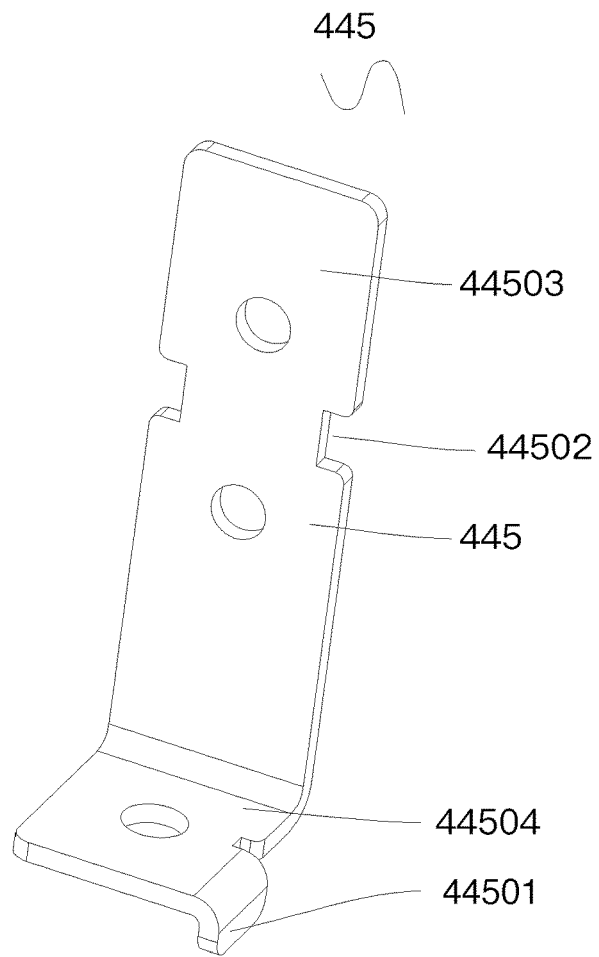
FIG. 68 illustrates a connector example.
Figure 69:
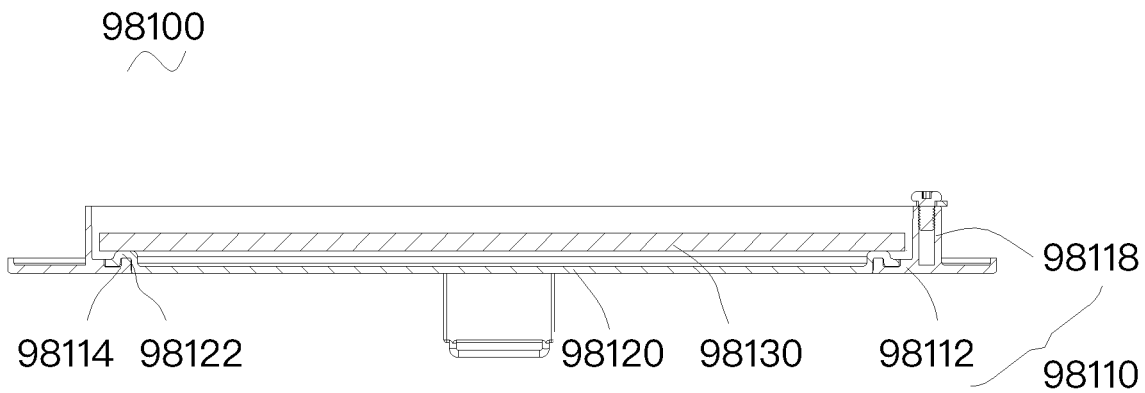
FIG. 69 illustrates a side view of a diffusion cover and related components.
Figure 70:
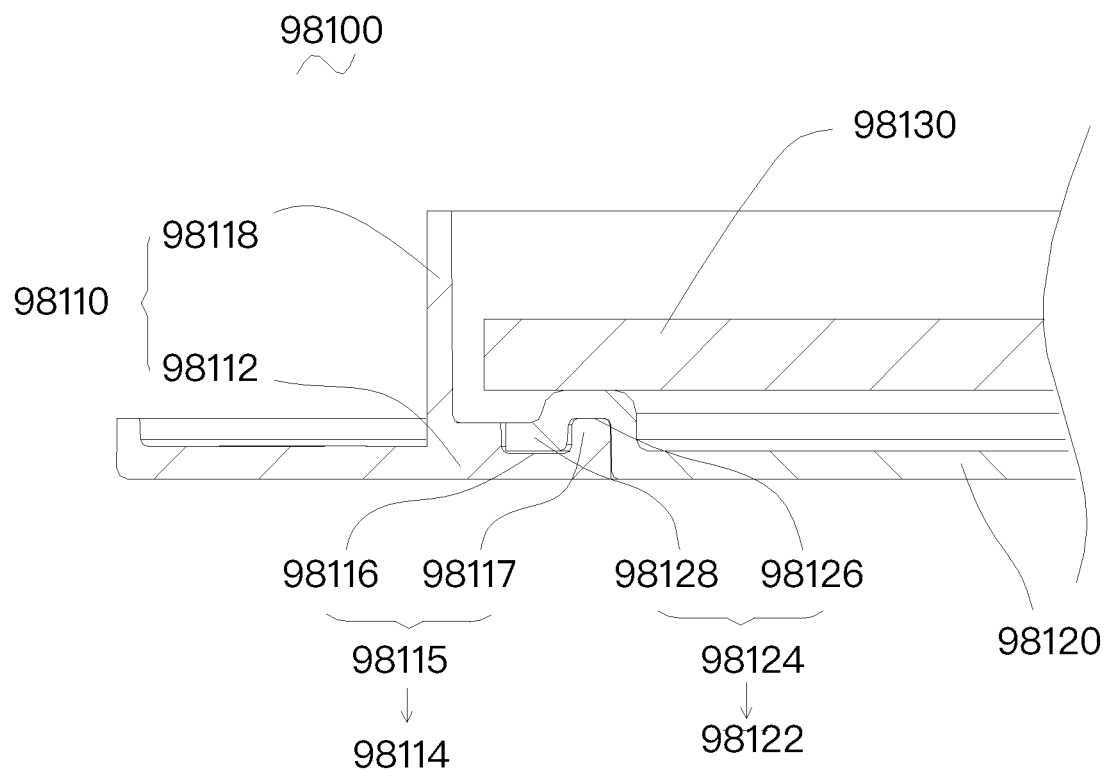
FIG. 70 illustrates a zoom-up view of the diffusion cover and related components.
Figure 71:
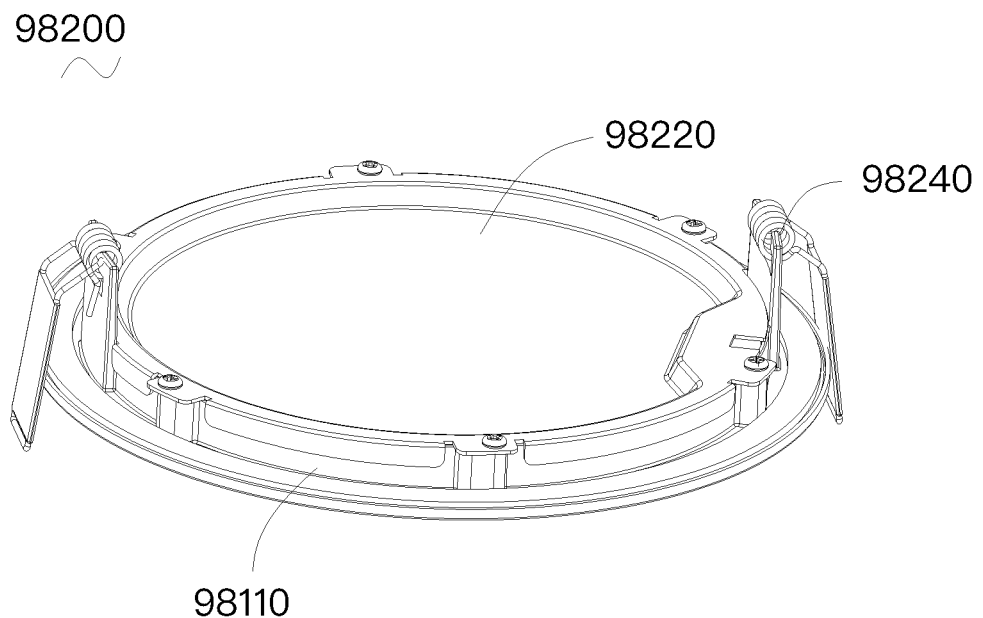
FIG. 71 illustrates a rim part example.
Figure 72:
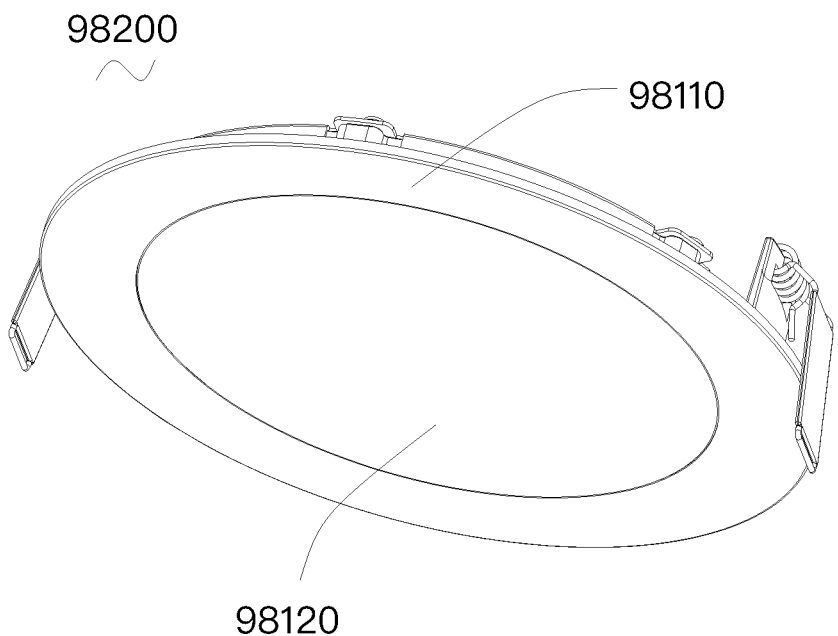
FIG. 72 illustrates another view of the example in FIG. 71.
Figure 73:
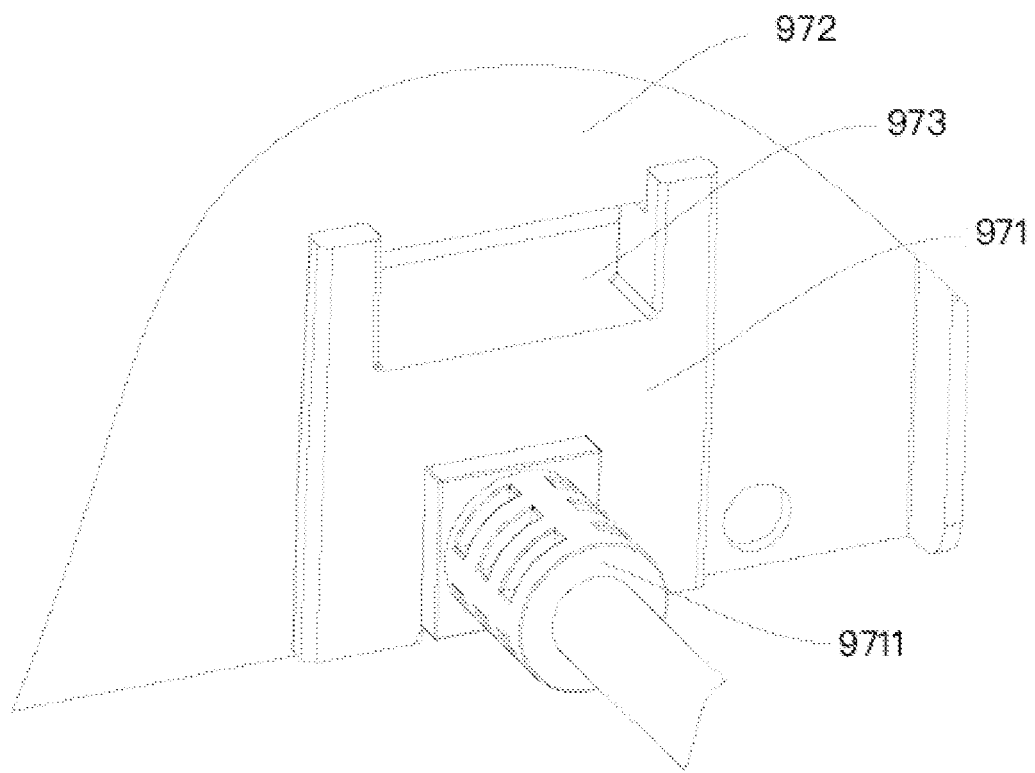
FIG. 73 illustrates a wiring unit example.
Figure 74:
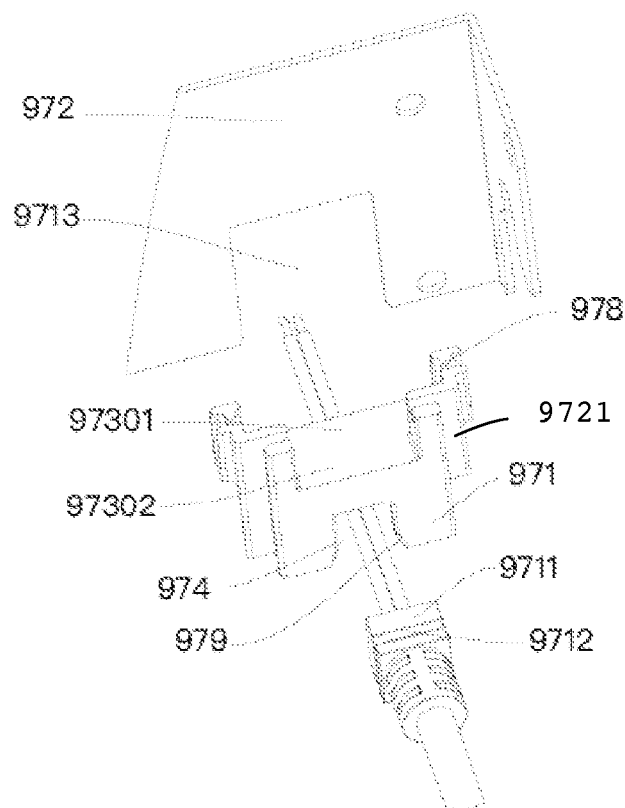
FIG. 74 illustrates an exploded view of the example in FIG. 73.
Figure 75:
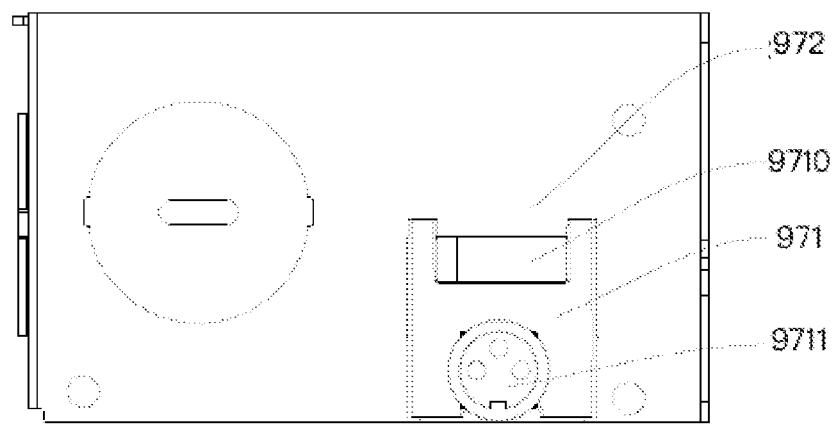
FIG. 75 illustrates a driver box with the wiring unit.
Figure 76:
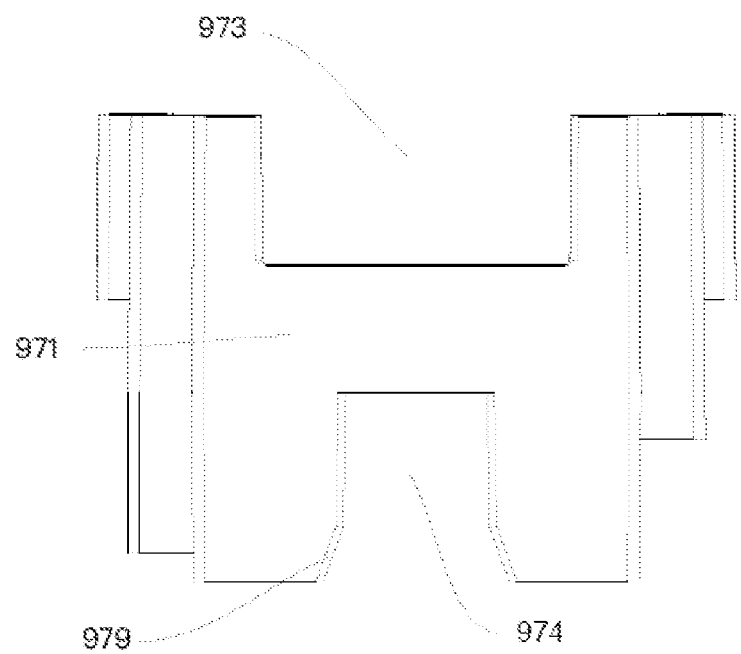
FIG. 76 illustrates a side view of the wiring unit.
Figure 77:
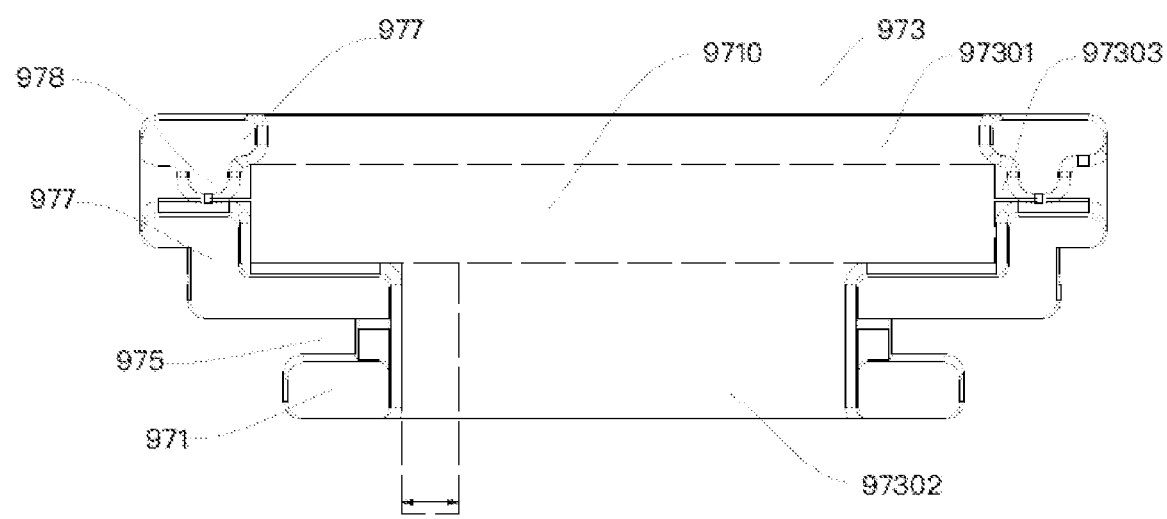
FIG. 77 illustrates another view of the wiring unit.
Figure 78:
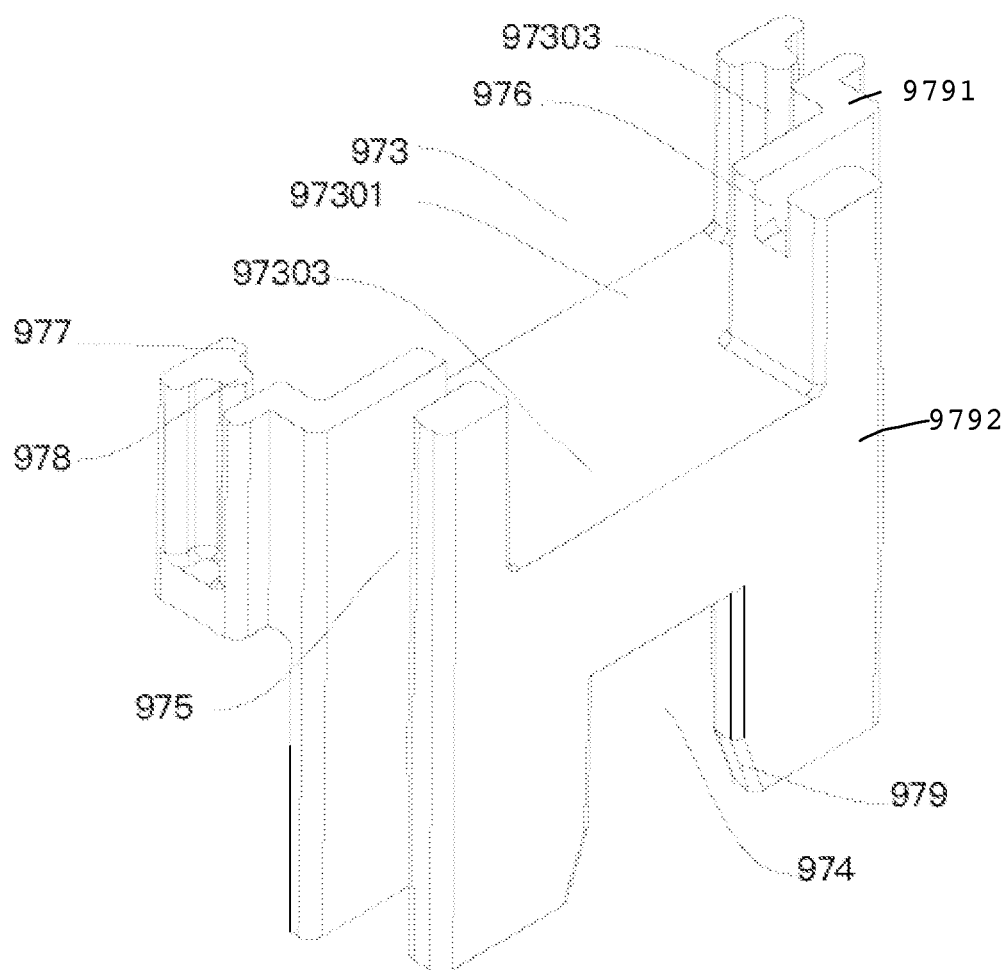
FIG. 78 illustrates another view of the wiring unit.
Figure 79:
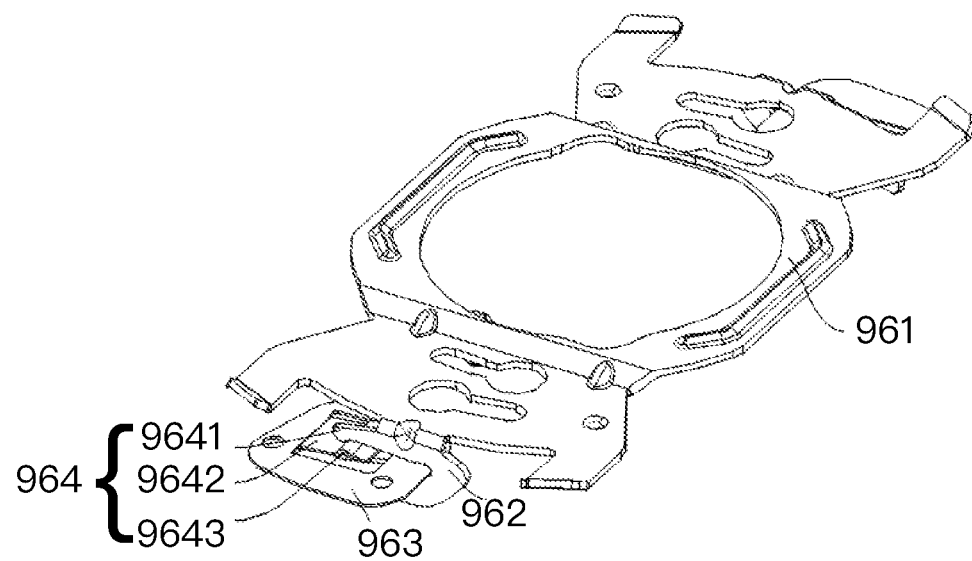
FIG. 79 illustrates a fixing bracket example.
Figure 80:
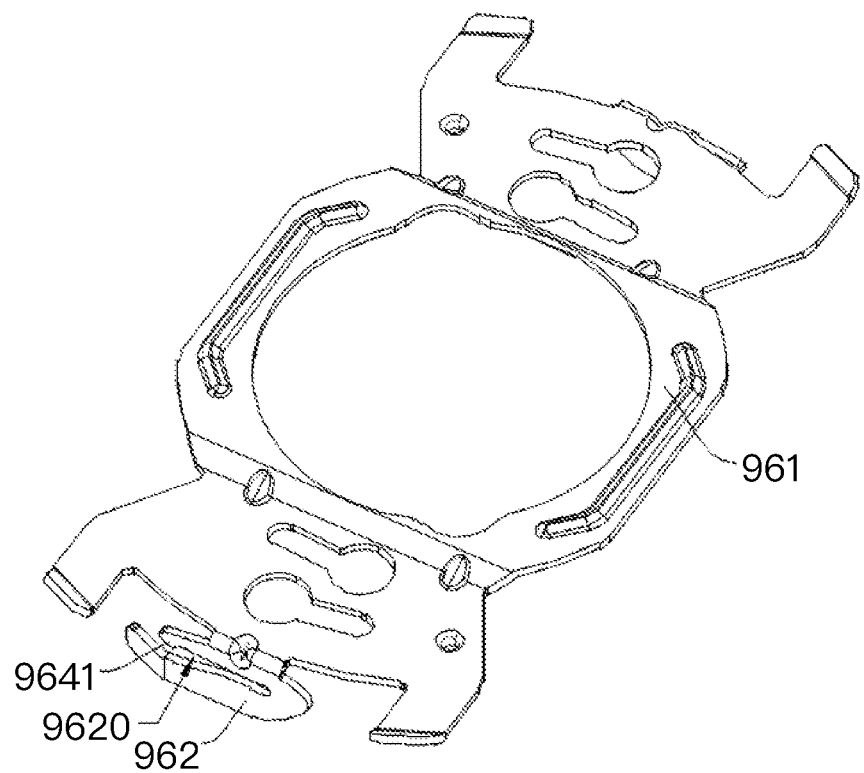
FIG. 80 illustrates another fixing bracket example.
Figure 82:
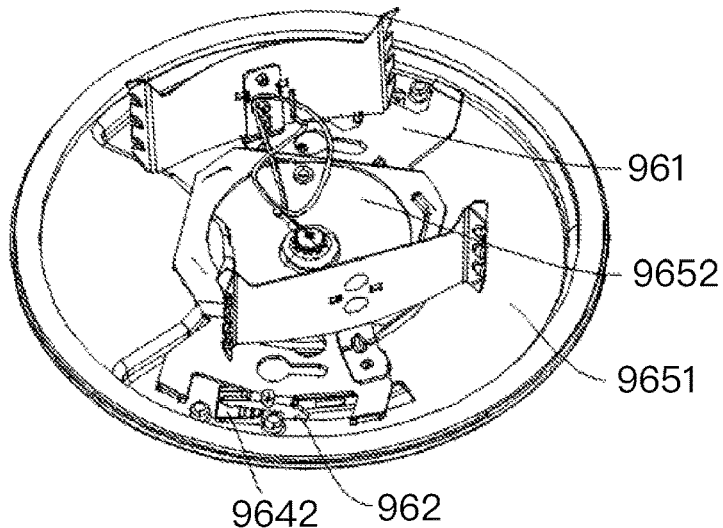
FIG. 82 illustrates a top view of a downlight example with the fixing bracket.
Figure 84:
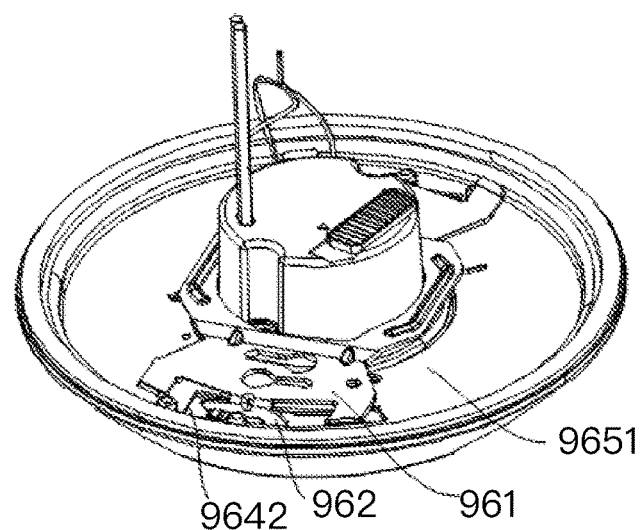
FIG. 84 illustrates a top view of another downlight example.
Figure 85:
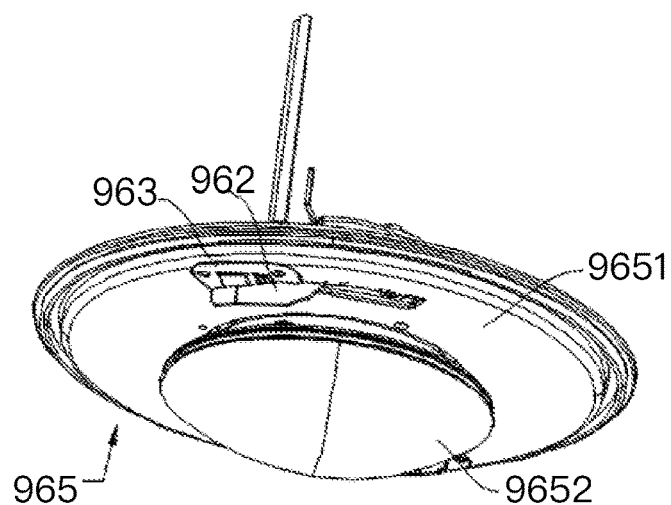
FIG. 85 illustrates another view of the example in FIG. 84.
Figure 86:
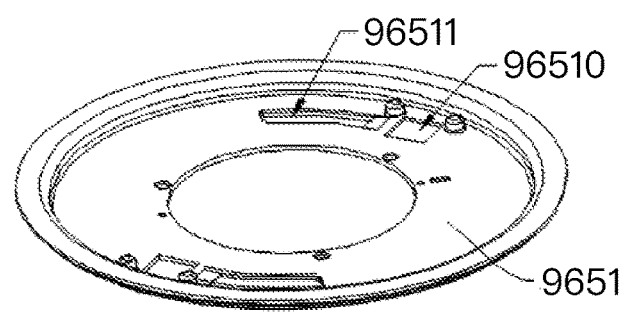
FIG. 86 illustrates a component in the example of FIG. 85.

FIG. 42 illustrates a reflective cup example.
FIG. 43 illustrates a top view of the example in FIG. 42.
FIG. 44 illustrates a side view of the example in FIG. 42.
FIG. 45 illustrates a top view of a light housing.
FIG. 46 illustrates another top view of the light housing example in FIG. 45.
FIG. 47 illustrates a cross-sectional view of the example in FIG. 46.
FIG. 48 illustrates a diffusion cover.
FIG. 49 illustrates a side view of a downlight example.
FIG. 50 illustrates a top view of the example in FIG. 49.
FIG. 51 illustrates another view of the example in FIG. 50.
FIG. 52 illustrates an exploded view of the example in FIG. 51.
FIG. 53 illustrates an elastic plate example.
FIG. 54 illustrates a connector example.
FIG. 55 illustrates another connector example.
FIG. 56 illustrates a torsion spring zoom-up view.
FIG. 57 illustrates another downlight example.
FIG. 58 illustrates a top view of the example in FIG. 57.
FIG. 59 illustrates another view of the example in FIG. 58.
FIG. 60 illustrates an exploded view of the example in FIG. 59.
FIG. 61 illustrates a connector example.
FIG. 62 illustrates a torsion spring zoom-up view.
FIG. 63 illustrates another downlight example.
FIG. 64 illustrates a top view of the example in FIG. 63.
FIG. 65 illustrates another view of the example in FIG. 64.
FIG. 66 illustrates an exploded view of the example in FIG. 65.
FIG. 67 illustrates an elastic plate example.
FIG. 68 illustrates a connector example.
FIG. 69 illustrates a side view of a diffusion cover and related components.
FIG. 70 illustrates a zoom-up view of the diffusion cover and related components.
FIG. 71 illustrates a rim part example.
FIG. 72 illustrates another view of the example in FIG. 71.
FIG. 73 illustrates a wiring unit example.
FIG. 74 illustrates an exploded view of the example in FIG. 73.
FIG. 75 illustrates a driver box with the wiring unit.
FIG. 76 illustrates a side view of the wiring unit.
FIG. 77 illustrates another view of the wiring unit.
FIG. 78 illustrates another view of the wiring unit.
FIG. 79 illustrates a fixing bracket example.
FIG. 80 illustrates another fixing bracket example.
FIG. 81 illustrates an elastic stop unit example.
FIG. 82 illustrates a top view of a downlight example with the fixing bracket.
FIG. 83 illustrates another view of the example in FIG. 82.
FIG. 84 illustrates a top view of another downlight example.
FIG. 85 illustrates another view of the example in FIG. 84.
FIG. 86 illustrates a component in the example of FIG. 85.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A downlight apparatus, comprising:
a light source;
a light holder for placing the light source, the light holder has a first side defining a light opening;
a driver box placed on a second side of the light holder, wherein the driver box contains a driver for converting an external power to a driving current supplied to the light source to emit a light from the light opening;
a fixing bracket coupled to the light holder for fixing to an installation cavity, wherein the fixing bracket has a bottom plate and two connector plate, wherein the bottom plate is fixed to the second side of the light holder, wherein the two connector plates are disposed vertically to the bottom plate, wherein each connector plate has two side units; and
two torsion springs, wherein a top plate of the driver box has a wire socket and a manual switch, wherein the wire socket is connected to a power wire and the manual switch is used for adjusting a setting of the light source, wherein the top plate of the driver box further has a rotation switch for continuously setting a maximum light intensity of the light source.

2. The downlight apparatus of claim 1, wherein each torsion spring has an elastic center and two arms, wherein the two arms are elastically spreading with different angles with respect to the elastic center, wherein the two torsion springs are attached to a lateral side of the two connector plates, wherein either the two torsion springs are elastically squeezed to engage the installation cavity or the side units of the connector plates are elastically squeezed to engage the installation cavity.

3. The downlight apparatus of claim 1, wherein the installation cavity is a cavity in a junction box.

4. The downlight apparatus of claim 3, wherein the driver box has an elastic hook, wherein when the central hole of the bottom plate passes reaches a bottom edge of the driver box, the elastic hook locks the bottom plate to the second side of the light holder.

5. The downlight apparatus of claim 1, wherein the bottom plate of the fixing bracket has a central hole for the driver box to pass through.

6. The downlight apparatus of claim 1, wherein the bottom plate has multiple connection holes for fixing the bottom plate to the installation cavity with bracket connectors.

7. The downlight apparatus of claim 6, wherein the connection hole is a key hole with an larger entrance and a smaller siding track, wherein the bracket connector enters the larger entrance and then stays in the sliding track to fix the bottom bracket to the installation cavity.

8. The downlight apparatus of claim 1, wherein the connector plates are detachable from the bottom plate.

9. The downlight apparatus of claim 8, wherein the connector plates are fixed to the bottom plate with screws.

10. The downlight apparatus of claim 1, wherein the two side units are two folded plates folding with respect to a main body of the connector plate.

11. The downlight apparatus of claim 10, wherein a folding angle of the folded plate with respect to the main body of the connector plate is larger than 90 degrees.

12. The downlight apparatus of claim 1, wherein the connector plates are made as the same metal piece as the bottom plate and are folded vertically with respect to the bottom plate.

13. The downlight apparatus of claim 1, wherein the fixing bracket has a scraper for scraping a portion of electric insulation layer on the second side of the light holder for electrically connecting the light holder to ground.

14. The downlight apparatus of claim 1, wherein the light source comprises multiple LED modules distributed in a first range, wherein the bottom plate has a larger size than the first range to carry heat of the first range outside the first range.

15. The downlight apparatus of claim 1, wherein the bottom plate has multiple bracket connectors, wherein the second side of the light holder has corresponding multiple holder connectors, wherein the bracket connectors are respectively slided to engage the holder connectors by rotating the light holder with respect to the fixing bracket.

16. The downlight apparatus of claim 15, wherein a reverse lock structure prevents the bracket connector accidently escape from the holder connector.

17. The downlight apparatus of claim 16, wherein the bracket connector is vertical to the holder connector.

18. The downlight apparatus of claim 1, wherein the light source has a light source plate mounted with LED modules, wherein the light source plate is connected to the light holder to connect to the ground.

19. The downlight apparatus of claim 1, wherein multiple metal shafts are used for electrically connecting the light source plate and the light holder.

\* \* \* \* \*